(12) United States Patent
Yaseen et al.

(10) Patent No.: US 11,054,972 B2
(45) Date of Patent: Jul. 6, 2021

(54) CONTEXT-BASED USER ASSISTANCE AND SERVICE WORKSPACE

(71) Applicant: ServiceNow, Inc., Santa Clara, CA (US)

(72) Inventors: Rahim M. Yaseen, Redwood City, CA (US); Sean K. Frogner, Walnut Creek, CA (US)

(73) Assignee: ServiceNow, Inc., Santa Clara, CA (US)

( * ) Notice: Subject to any disclaimer, the term of this patent is extended or adjusted under 35 U.S.C. 154(b) by 25 days.

(21) Appl. No.: 15/905,215

(22) Filed: Feb. 26, 2018

(65) Prior Publication Data

US 2019/0265865 A1    Aug. 29, 2019

(51) Int. Cl.
| | |
|---|---|
| *G06F 3/0484* | (2013.01) |
| *H04L 12/58* | (2006.01) |
| *H04L 29/08* | (2006.01) |
| *G06Q 30/00* | (2012.01) |
| *G06F 16/27* | (2019.01) |

(52) U.S. Cl.
CPC ....... *G06F 3/04842* (2013.01); *G06Q 30/016* (2013.01); *H04L 51/02* (2013.01); *H04L 67/22* (2013.01); *G06F 16/27* (2019.01)

(58) Field of Classification Search
CPC .............................. G06F 3/04842; H04L 51/02
See application file for complete search history.

(56) References Cited

U.S. PATENT DOCUMENTS

| | | | |
|---|---|---|---|
| 9,647,968 B2 | 5/2017 | Smullen et al. | |
| 2008/0172574 A1* | 7/2008 | Fisher | G06N 5/02 714/25 |
| 2011/0022641 A1* | 1/2011 | Werth | H04L 67/34 707/803 |
| 2012/0259891 A1 | 10/2012 | Edoja | |
| 2014/0211934 A1* | 7/2014 | Jaffer | H04M 3/5191 379/265.09 |
| 2015/0106736 A1* | 4/2015 | Torman | G06F 16/13 715/745 |
| 2018/0013699 A1 | 1/2018 | Sapoznik et al. | |

OTHER PUBLICATIONS

Extended European Search Report for EP Patent Application No. 19158649.4 dated May 14, 2019; 7 pgs.

* cited by examiner

*Primary Examiner* — Maikhanh Nguyen
(74) *Attorney, Agent, or Firm* — Fletcher Yoder, P.C.

(57) ABSTRACT

An example embodiment may involve generating and providing, for display on a graphical user interface, a single window that includes a dialog region, a service region, and a contextual action bar. The dialog region may include locations for displaying a conversation between a user and an agent, and for entering a message to be added to the conversation. The service region may be for displaying a workspace for viewing a record relating to the user and accessing services provided via a back-end system by way of a managed network. The contextual action bar may include one or more selectable context-specific actions. The embodiment may also involve analyzing at least one of the conversation, the record relating to the user, and the services to identify contextual terms. The embodiment may also involve, based on the contextual terms, generating and providing, for display on the contextual action bar, a selectable context-specific action.

19 Claims, 16 Drawing Sheets

CONTEXT-BASED USER ASSISTANCE AND SERVICE WORKSPACE

BACKGROUND

Enterprise software systems may be used to implement operational processes for an enterprise, and may typically take the form of software applications. Such applications may include a desktop or web-based application developed for usage by internal users (e.g., employees of the enterprise), as well as for external users such as customers that engage in transactions with the enterprise. One such application may enable an agent, such as a customer service agent or information technology agent, to engage in a conversation with an internal or external user in an attempt to resolve an issue, or "incident," for the user. This application might provide the agent with a complex interface or other mechanisms that may impede the agent's ability to meet the user's needs and resolve the incident.

For example, the interface may require the agent to open multiple graphical user interface (GUI) windows, such as one window that enables the agent to converse with the user, and another, separate window that enables the agent to view a record associated with the current incident. As another example, the record may be lengthy and/or may contain complex information, and thus the agent might spend an undesirable amount of time looking up relevant information in the record. Further, the application may cause the agent to spend an undesirable amount of time inputting lengthy portions of information and/or repeatedly copy/pasting information from one window to another.

SUMMARY

The embodiments herein improve upon the enterprise systems discussed above and provide systems and corresponding methods for facilitating streamlined assistance to users. Such an approach may help the agent quickly and efficiently meet the user's needs and resolve the incident, without the agent needing to navigate a complex interface and/or spend excessive time entering and looking up information.

In accordance with the present disclosure, a user assistance system may provide an interface comprising a single window in which the agent may engage in a conversation with the user about an incident, as well as use an interactive workspace for viewing records associated with the user and accessing various services provided via the enterprise's managed network. Herein, the term "record" may refer to any information relating to a user or a specific incident experienced by the user. Such information may include, by way of example, incident details, previous conversations between the user and one or more agents (both human and virtual chatbot agents), previous incidents experienced by the user, the user's name, and the user's location.

The single window may also include a contextual action bar that includes one or more context-specific actions that the agent can perform. Such context-specific actions may relate to the conversation, the record, the services provided via the enterprise's managed network, and/or other information in the window. As the agent converses with the user, uses the interactive workspace, and/or performs other actions within the window, the user assistance system may analyze the conversation, the record, the services provided via the enterprise's managed network, and/or other information in the window, to dynamically identify relevant contextual terms and generate/display one or more selectable context-specific actions relating to those identified contextual terms.

Accordingly, a first example embodiment may involve generating and providing, for display on a graphical user interface, a single window of the graphical user interface. The single window may include a dialog region, a service region, and a contextual action bar. The dialog region may include a first location for displaying a conversation between a user and an agent, and a second location for entering a message to be added to the conversation. The user may be associated with a managed network that is remotely managed by a remote network management platform. The service region may be for displaying an interactive workspace for use by the agent to view a record relating to the user and access one or more services provided via a back-end computing system by way of the managed network. The contextual action bar may include one or more selectable context-specific actions relating to at least one of the conversation, the record relating to the user, or the one or more services. The first example embodiment may also involve analyzing at least one of the conversation, the record relating to the user, and the one or more services to identify contextual terms. The first example embodiment may also involve, based on the identified contextual terms, generating and providing, for display on the graphical user interface, on the contextual action bar, a selectable context-specific action.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
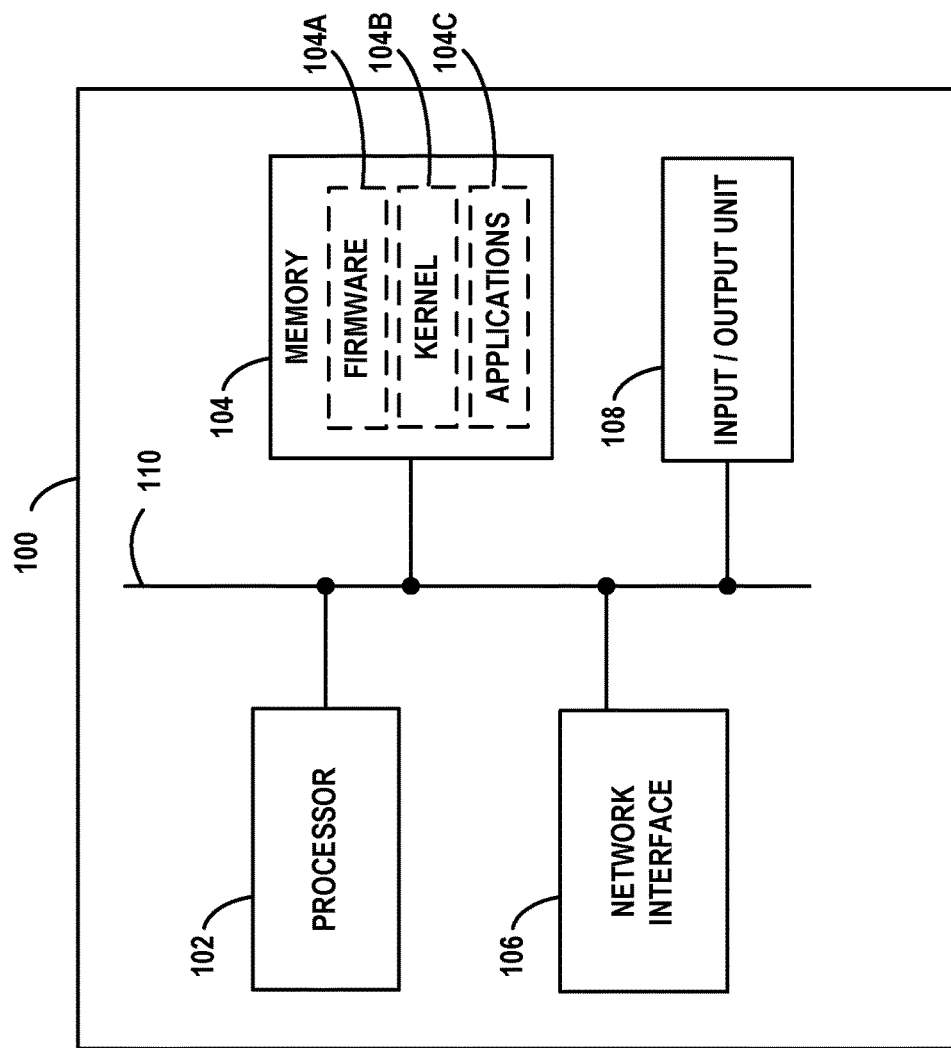
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
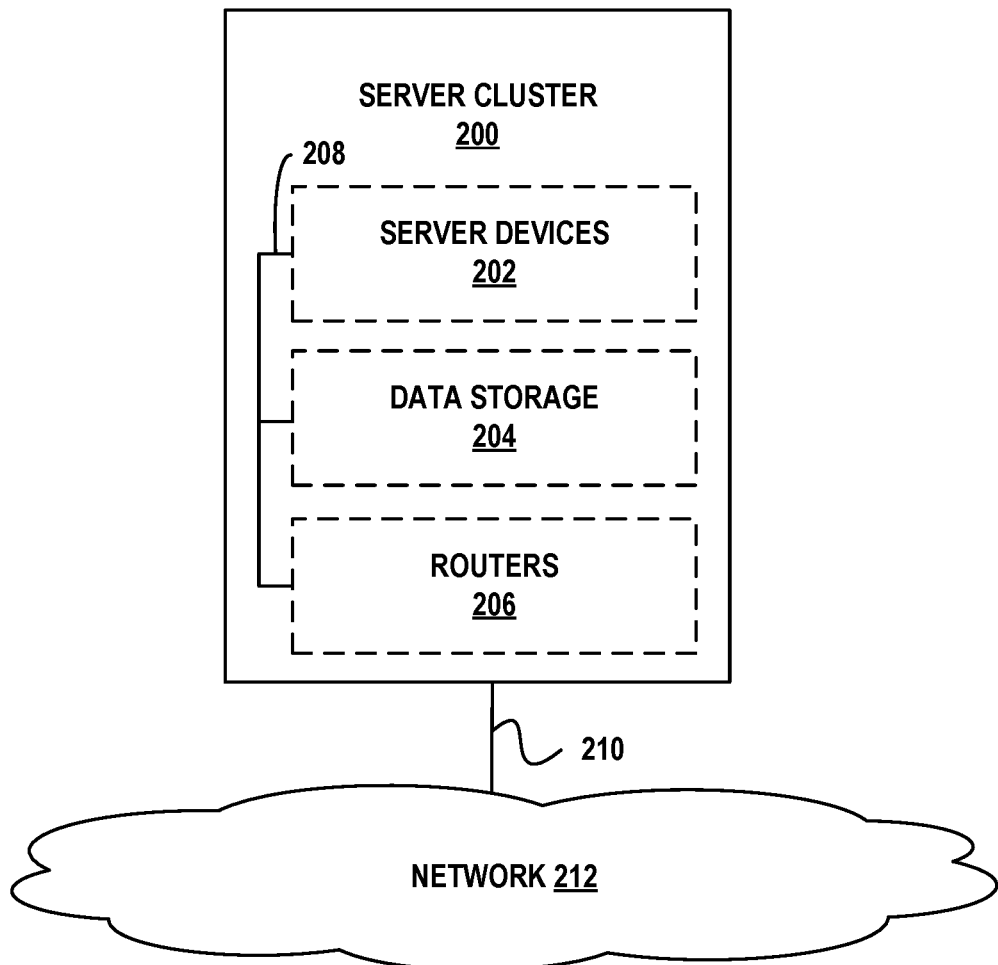
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
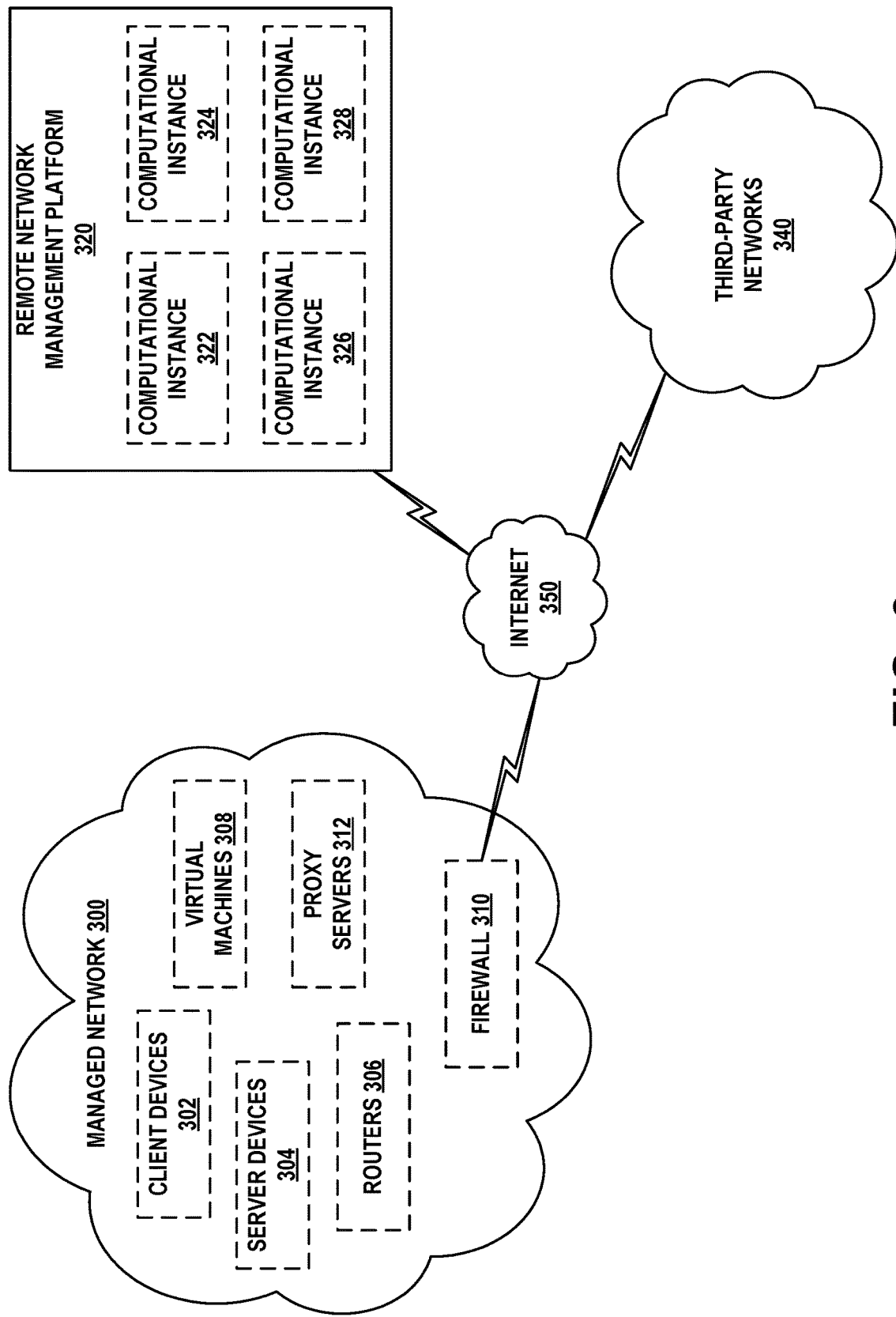
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
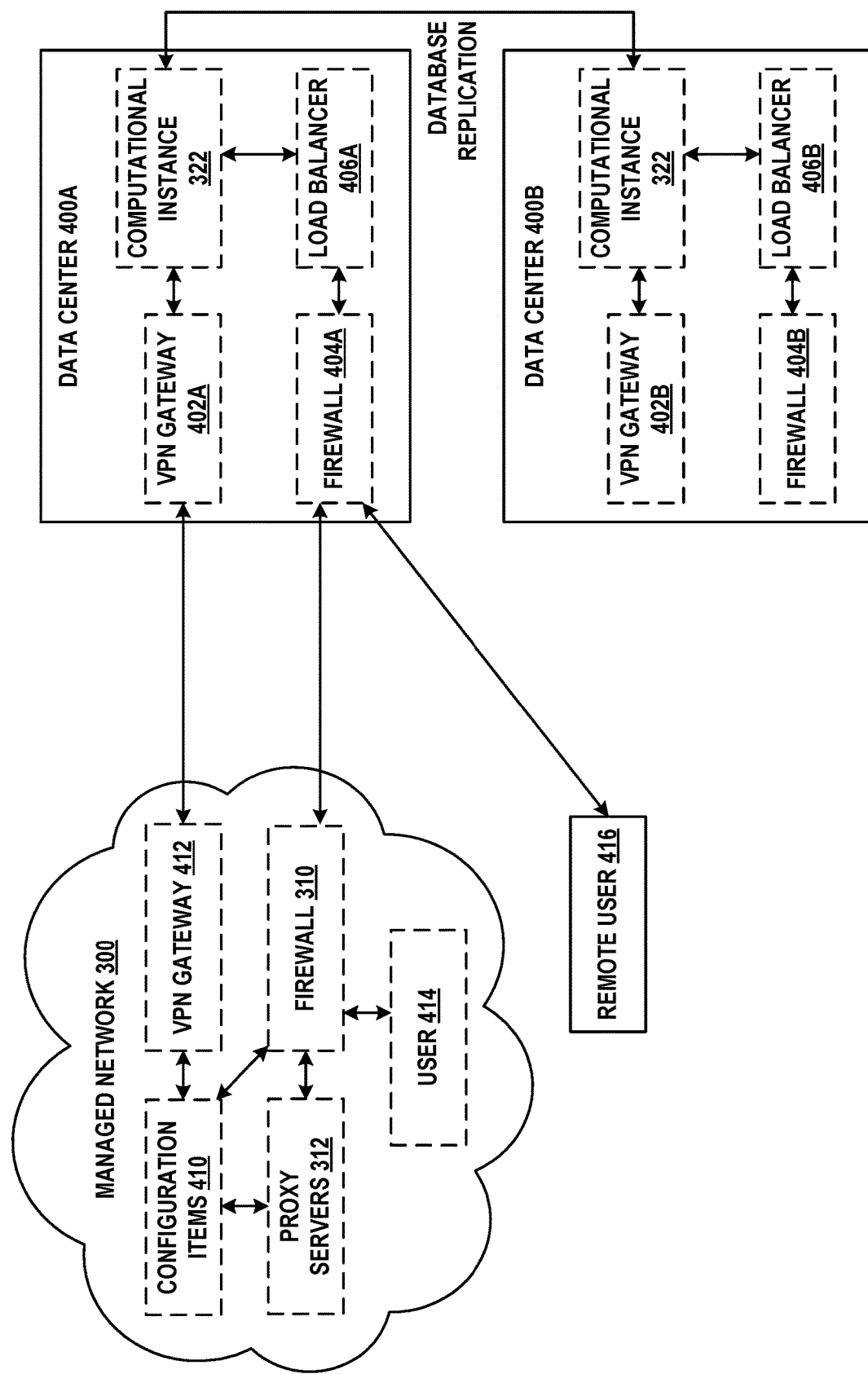
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
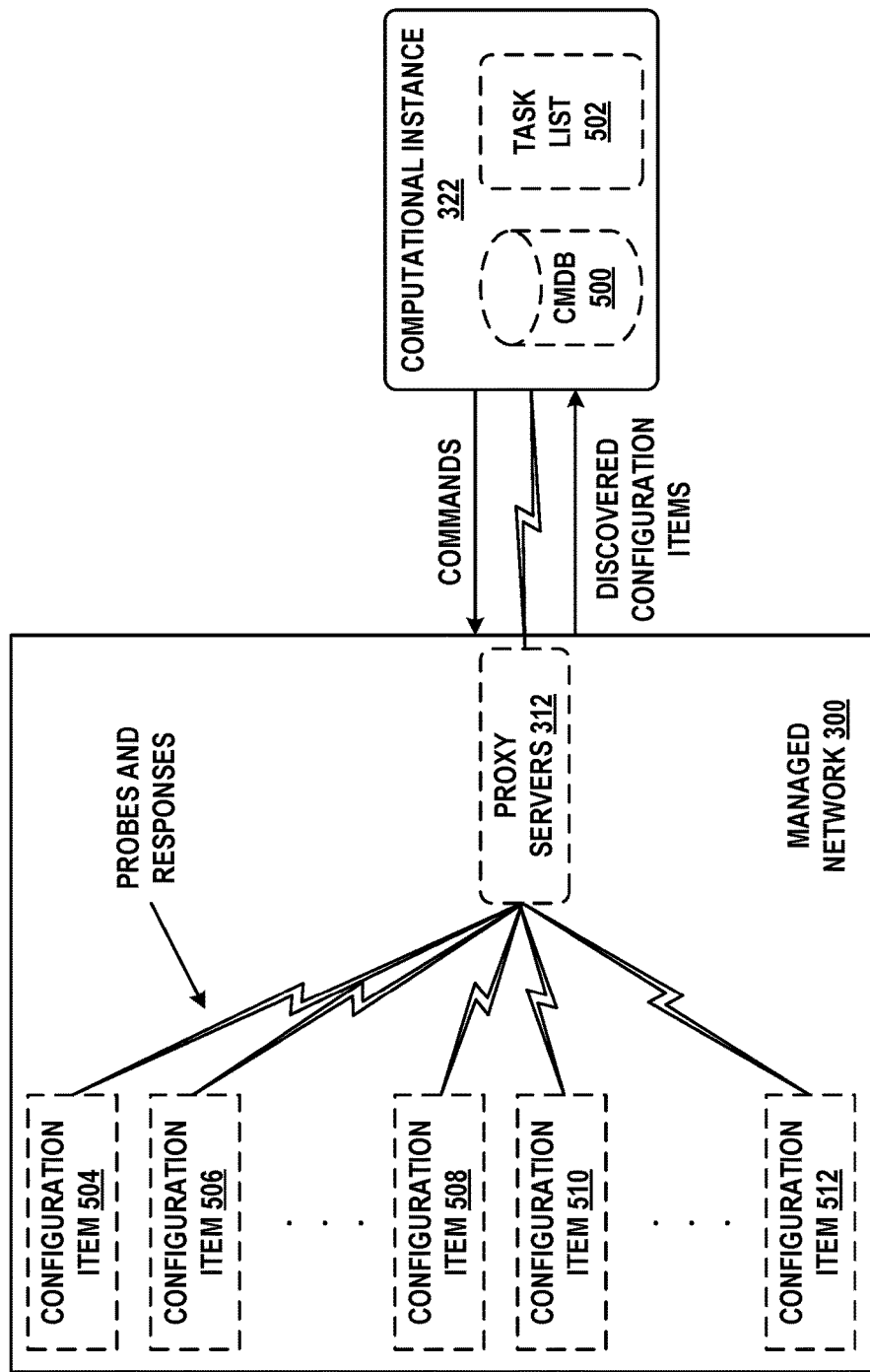
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
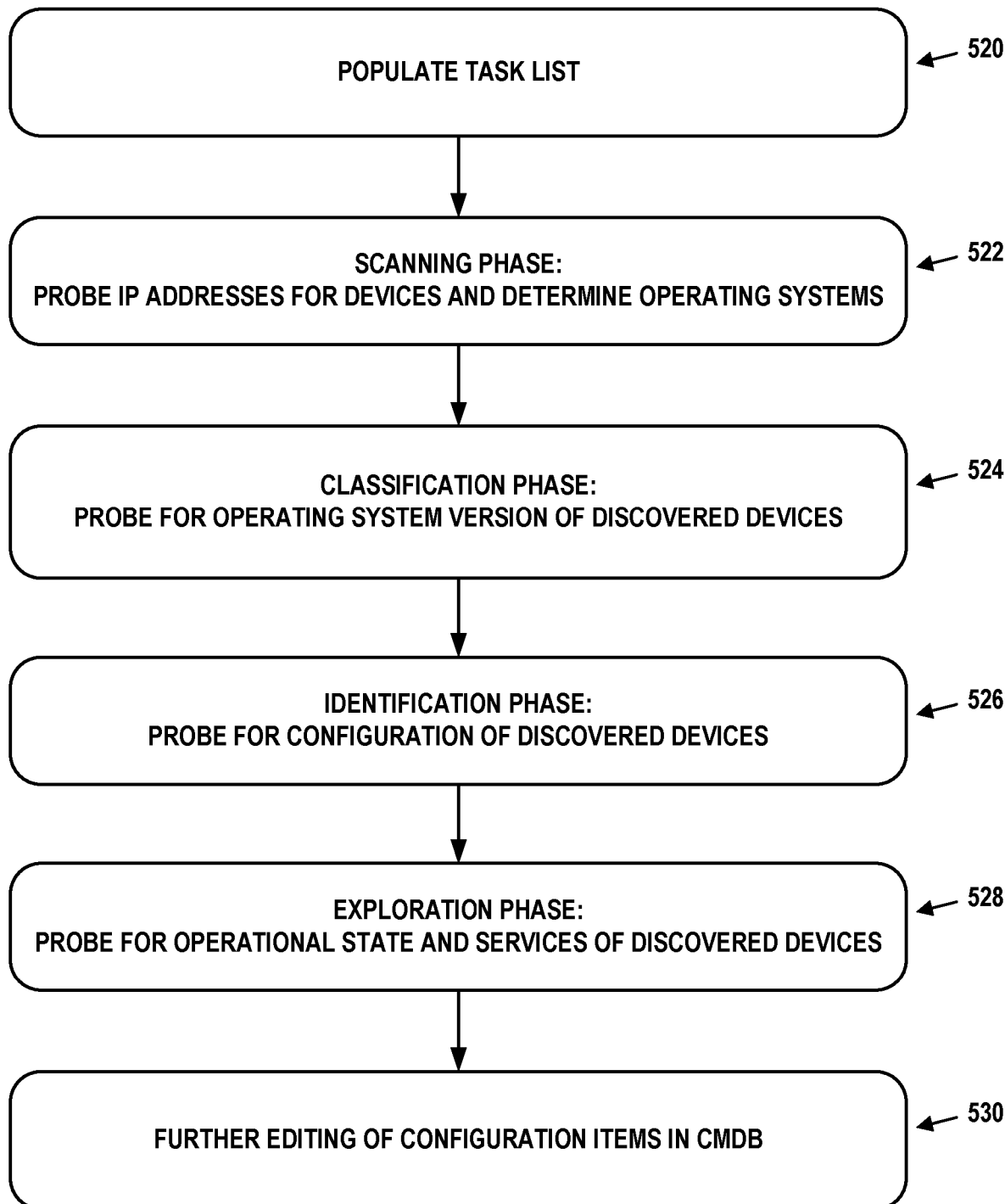
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE USER ASSISTANCE OPERATIONS

As noted above, in a scenario where an agent is tasked with assisting a user associated with a managed network (such as when an agent of an enterprise is assisting a customer of the enterprise), the agent may encounter various issues when providing this assistance. For example, the system that the agent uses to provide assistance may require the agent to open multiple GUI windows, such as a first window in which the agent converses (e.g., textual communication, such as instant messaging or Short Message Service (SMS)) with the user and a second window in which the agent views a record that provides information about the user and summarizes the issue with which the agent is assisting the user. In fact, the system may require the agent to open more than two windows at a time, depending on the nature of the issue with which the agent is assisting the user, and perhaps also depending on which services may be needed to assist the user. For instance, if the record involves the user requesting a new laptop computer, the agent may be required to open, in addition to the window(s) for viewing the conversation and the record, a window for accessing and viewing the enterprise's IT purchasing and inventory database. In line with this, the system may require or encourage the agent to have an undesirable amount of applications simultaneously operating on the agent's computing device(s).

Additionally or alternatively, the record may be lengthy and/or may contain complex information, which may impede the agent's ability to efficiently assist the user. Additionally or alternatively, the system may require or encourage the agent to manually enter the entirety of response messages to the user, which may involve the agent spending time typing out lengthy portions of information from the record and/or repeatedly copy/pasting information from the record window to the conversation window.

Additionally or alternatively still, various issues may arise in scenarios where the user is transferred to a human agent after the user has received assistance from a virtual agent (or "virtual chatbot"), namely, an at-least-partially-automated computing system that may be configured to provide automated assistance to the user in conjunction with, or in lieu of, a human agent. For example, the system may not enable the human agent to view the entirety (or any) of the conversation that took place between the user and the virtual chatbot, and thus the human agent may end up asking the user for the same information that the virtual chatbot asked for, or otherwise repeating aspects of the conversation that transpired prior to the human agent's involvement. This repetition can cause the assistance process to be inefficient.

Accordingly, the present disclosure provides an improved user assistance system that can address the issues described above and/or other issues by employing various methods for streamlining management of user assistance. Such a system may provide, in a single GUI window, a variety of information including, for instance, a chat interface and an interactive workspace (e.g., a web portal) through which the agent can view and access the record as well as other services that the enterprise's managed network provides via one or more back-end computing systems. When the interactive workspace is being used to access services, the interactive workspace may be referred to as, or include as part of the workspace, a "service catalog" that enables such access. Further, such a system may require or encourage fewer applications to be simultaneously operating on the agent's computing device(s), thereby reducing processing and memory utilization. Still further, in the scenario in which the user is transferred from a virtual chatbot to a human agent, such a system may provide a seamless transfer from the perspectives of both the user and the human agent that is taking over. For instance, on the human agent side, the system may maintain the conversation transcript between the virtual chatbot and the user that preceded the transfer, display that conversation for the human agent in the chat interface, and enable the human agent to then continue the conversation, after which additional context can be provided and used to provide context-specific options for further assisting the user.

These and other improvements are described in more detail below, though it should be understood that the operations described below are for purposes of example. Systems relating to user assistance may provide other improvements as well.

In some embodiments, an enterprise may operate the user assistance system (e.g., manage records and conversations with users associated with the managed network) to provide the enterprise's services to users. However, in other embodiments, the enterprise may operate the user assistance system on behalf of a client or another entity to facilitate that client's processes and provide that client's services to users. Further, in other embodiments, the enterprise may operate the user assistance system to provide to users both the enterprise's services and client's services, either separately, or as an integration of both services. The client may also operate the user assistance system, in some instances. In any event, for brevity's sake, the term "enterprise" may refer herein to an enterprise and/or a client of the enterprise. Furthermore, any individual (e.g., of the enterprise and/or client of the enterprise) that operates the user assistance system on behalf of the enterprise to provide assistance to users may be referred to herein as an "agent."

In some embodiments, the user assistance system described herein may take the form of a software application, which may be installed on remote network management platform 320. Through this software application, an agent that is using remote network management platform 320 may be able to provide assistance to users. Accordingly, for the purposes of discussion, computational instance 322 may represent this software application, and thus, the terms "user assistance system" and "computational instance 322" may be used interchangeably to refer to the user assistance system of the present disclosure. It should be understood, however, that such a user assistance system could take other forms, such as an application deployed on the agent's computing device, and in practice computational instance 322 may also support other applications.

In line with the discussion above, when a user of managed network 300 requests assistance with a particular task, a corresponding record may be generated and stored at a database accessible by the user assistance system. In the context of the present disclosure, such a record may be referred to as, or include, an "incident record" summarizing the task and/or other related information for assisting the user. Incidents can take various forms. For example, an internal user of the enterprise (e.g., an employee of an enterprise) may encounter an issue with the operation of their computing device and a member of the enterprise's IT team may be the agent tasked with resolving the issue. As another example, a customer of the enterprise may engage in a transaction with the enterprise (e.g., ordering an item), and may perhaps additionally request assistance relating to the transaction (e.g., a request for a refund if the ordered item does not arrive or is defective). Other examples are possible as well.

The incident record can be generated in various ways. For instance, the user assistance system can be configured to autonomously generate the incident record upon receipt of certain information from the user related to the task. Additionally or alternatively, an agent or other authorized administrator may generate the incident record either manually or with the help of the user assistance system. Further, upon generation of the incident record, the incident may be assigned to an agent. Through the user assistance system, the agent may then access the incident record and begin providing assistance to the user in an attempt to bring the incident to a close.

The incident record can take the form of a set of data that represents a variety of information, or "components," associated with the incident. Such components can include, for example: (i) an identifier of the user (e.g., the user's name, or a unique string of characters associated with the user), (ii) a status of the incident (e.g., open, unassigned, in progress, closed), (iii) a description of the incident (e.g., a manually, semi-autonomously, or fully-autonomously generated textual summary of the problem the user has encountered), (iv) a date/time when the incident record is created, (v) dates/times when the status of the incident or any other information of the incident record is changed, (vi) a current owner of the incident record (e.g., the agent or group of agents to which the task is assigned), (vii) a priority level for the incident (e.g., low, medium, or high), (viii) information indicating any efforts that has been made towards resolving the incident (e.g., dates/times such efforts were started and/or completed, and a description of such efforts), (ix) an incident number, (x) a date/time by which resolution of the incident is due or requested by the user to be completed, and/or other possible information. This information may be textual, or may include images, sounds, videos, etc.

In addition, to further facilitate user assistance, the user assistance system may generate, store, and/or otherwise have access to other types of records. One such record may take the form of a user profile record that provides details about the user including, but not limited to, (i) the user's name, (ii) the user's title (e.g., "Developer," "Engineer"), (iii) the user's email address, (iv) an enterprise with which the user is employed, (v) the user's and/or employer's business address, (vi) the user's business phone number, (vii) the user's mobile phone number, (viii) a department for which the user works (e.g., "Development," "Engineering,"

"HR," "IT"), (ix) configuration items (e.g., hardware and/or software) associated with the user, (x) other groups to which the user belongs, (xi) a history of interactions between the user and human/virtual agents, (xii) past incident records relating to the user, (xiii) any preferences dictated by the user (e.g., a preferred method for contacting the user, such a third-party messaging application) and/or other possible information. Any or all of this information may be textual, or may include images, sounds, videos, etc.

As noted above, the term "record" may be used herein to refer to a user profile record, an incident record, and/or other possible types of records relevant to user assistance. In some embodiments, at least a portion of the information in the user profile record may also be present in the incident record, or may be represented as selectable links for viewing corresponding information in the incident record. Further, the user assistance system may automatically update the record over time while user assistance is carried out, or may enable the agent to update the record.

In some embodiments, the user assistance system may generate and provide a single window of a GUI. The window may include multiple regions, and each region may include a particular type of information.

For example, the window may include a dialog region in which the agent can engage in a textual conversation with the user. The dialog region may include a first location for displaying at least a portion of the conversation, including messages received from the user and/or messages sent by the agent. Further, the dialog region may also include a second location for entering messages to be added to the conversation. A message from the agent to the user may be displayed at the second location for the agent's review, and the second location may include a GUI element that the agent may select to cause the message to be added to the conversation. It should be understood that, in other examples, additional or alternative types of conversations with the user are possible, such as a voice call and/or video call.

In addition, the window may include a service region for displaying an interactive workspace for use by the agent. Using this interactive workspace, the agent may perform a variety of actions. For example, the user can view the record relating to the user and/or access one or more services provided by the enterprise. Such services may include, but may not be limited to, knowledge base services, or services provided by IT, HR, purchasing, finance, and/or other departments/entities associated with the enterprise. To facilitate provision of such services, the user assistance system may be communicatively coupled, via a web server or other type of server, to one or more back-end computing systems (e.g., back-end servers and/or databases). Each such back-end computing system may be associated with a particular department/entity that provides certain services and may contain information for use by the agent in providing assistance to the user in accordance with such services.

Figure 6:
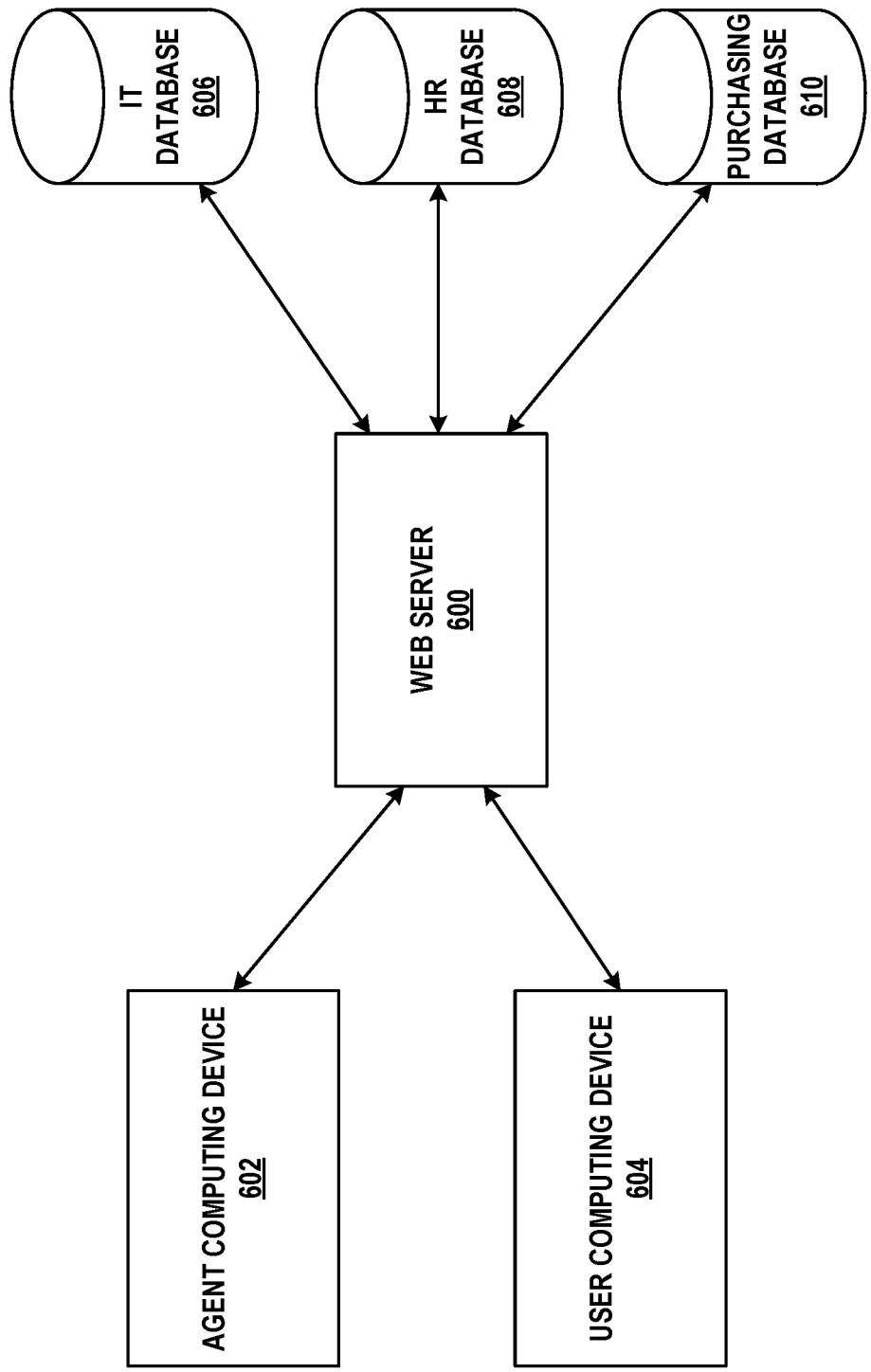
FIG. 6 illustrates a block diagram depicting a user assistance system, in accordance with example embodiments.

FIG. 6 illustrates a block diagram depicting an example form that the user assistance system may take. As shown, the user assistance system includes a web server 600 that is communicatively coupled to both an agent computing device 602 and a user computing device 604. In addition, the web server 600 is communicatively coupled to various back-end computing systems, such as an IT database 606, an HR database 608, and a purchasing database 610. Any one or more of these back-end computing systems (or other back-end computing systems described herein) could be part of the same computational instance (e.g., computational instance 322) as the agent computing device 602, web server 600, etc., or could be part of a third-party computing system outside of the computational instance. Other back-end computing systems are possible as well, such as back-end computing system through which the enterprise's knowledge base is created and managed.

With the arrangement shown in FIG. 6, the user assistance system may provide an interface through which the agent and the user can communicate with each other, and additionally provide the agent with access to the various services described herein. For instance, the web server 600 may be configured to provide the single GUI window for the agent, and may be further configured to pull information from the back-end computing systems and provide that information to the agent, and possibly to the user as well.

To improve efficiency, agent experience, and user satisfaction in agent-user interactions, the user assistance system may be configured to enable the agent to quickly view relevant information, respond to the user with such relevant information, and perform relevant actions related to the incident—all of which may be accomplished using the single GUI window. In addition, to provide further improvements, the user assistance system may also be configured to use contextual terms from the conversation, the record, the service(s), and/or other sources as a basis to dynamically determine and provide for display, as part of the single window, selectable "context-specific" actions that are relevant to the agent and/or the user. Therefore, while the agent is engaging in the conversation with the user and/or performing other actions in addressing the incident, the agent may at various points in time have the option to select one or more context-specific actions, thereby triggering performance of such action(s). Consequently, user assistance can be further streamlined.

Accordingly, in some embodiments, the single window may include a contextual action bar that includes one or more such context-specific actions. In line with the discussion above, such context-specific actions may relate to the conversation, the record, one or more services, and/or any other information displayed in the service region or elsewhere in the single window. In some embodiments, the contextual action bar may be located in a region below or incorporated with the dialog region, or may be located elsewhere. Further, in some embodiments, the user assistance system may present the selectable context-specific actions in another form, different from a contextual action bar, such as a drop-down menu or other type of widget.

In any event, the user assistance system may provide each context-specific action as a selectable GUI element, perhaps with a visual indication (e.g., text and/or an image) representing the particular context-specific action. For example, a GUI element corresponding to a context-specific action for creating a ticket for a new incident may include plus sign or image of a ticket. Other examples are possible as well.

To analyze the conversation, the record, the services, and/or other information, identify contextual terms, and then determine one or more context-specific actions, the user assistance system may employ a variety of language processing elements and/or artificial intelligence (AI)-related techniques to better adapt to user and agent preferences. Additionally or alternatively, the user assistance system may maintain a history of user/agent interactions and corresponding outcomes, learn user intent, behavior, emotion, and patterns, predict user actions, parse information in the service region, etc. As a result, the user assistance system may improve the quality of the context-specific actions and enable agents to more efficiently resolve incidents. For example, the user assistance system may implement natural language processing, text mining, keyword recognition/ analysis, phrase recognition/analysis, voice recognition/ analysis, sentiment analysis, sentence structure recognition/ analysis, introspective data model management and analytics, and/or predictive analytics, among other elements. As another example, the user assistance system may implement AI-related techniques such as sentiment analysis, semantics analysis, and/or intent analysis, among other possibilities. Further, the user assistance system may use any of the techniques described above to ascertain an understanding and meaning of specific language used by the enterprise (e.g., acronyms and terms associated with the enterprise), the agent, and the user (e.g., shorthand).

In some embodiments, for example, the user assistance system may parse the conversation, the record, the services, and/or other information, and apply one or more predetermined classifiers configured (e.g., trained) to identify contextual terms contained therein. Such contextual terms may include, by way of example, information contained in a knowledge base article, information defining enterprise policies, keywords in a message received from the user, keywords in a message sent to the user from the agent, a location associated with the user (e.g., the address of the office where the user works), and/or any of the components of the incident record. Additionally or alternatively, such contextual terms may include information relating to an identifier of the third-party application that the user is using to converse with the agent (e.g., a third-party-managed chat application, or a custom version of the chat application associated with remote network management platform 320) and/or information relating to a geolocation of the user.

In some embodiments, in scenarios where the conversation was transferred form a virtual chatbot to a human user, the conversation that the user assistance system may parse for contextual terms may include not only the ongoing conversation between the human agent and the user, but also the conversation transcript between the virtual chatbot and the user that preceded the transfer. Other methods for identifying contextual terms are possible as well, and other types of contextual terms are possible as well.

In some embodiments, the user assistance system may be configured to determine candidate context-specific actions and provide for display only one or more such context-specific actions that meet certain criteria, such as a confidence score exceeding a predefined threshold. The scoring determined for such a context-specific action may indicate a level of confidence (e.g., on a scale of zero to one hundred) in the validity of the context-specific action and in how well the context-specific action will advance progress towards incident resolution.

To score a context-specific action, the user assistance system may employ AI-based technology and techniques, such as machine learning. For instance, the user assistance system may over time monitor various aspects of user assistance including conversation messages, agent actions, services requested and utilized, and use these aspects as a basis for making/refining various determinations of how to score or otherwise determine context-specific actions, perhaps improving the quality and relevance of such context-specific actions over time.

The user assistance system may score a context-specific action based on one or more factors. In some embodiments, for example, the user assistance system may score the context-specific action based on a relevance to one or more messages of the conversation between the agent and the user. As another example, the user assistance system may score the context-specific action based on a relevance to a particular service that the user is requesting or the agent is using. Other relevance-based scoring is possible as well.

In some embodiments, the user assistance system may score the context-specific action based on a set of rules that define what action might be desirable for the agent to take. As an example, such the rules may define paths (e.g., branches of a tree-based structure) that the agent and/or user may follow to achieve a desired result (e.g., resolution of the incident), and the user assistance system may implement techniques such as heuristics to determine which path to follow in the conversation.

In some embodiments, the user assistance system may score the context-specific action based on a sentiment analysis of one or more messages of the conversation between the agent and the user. Sentiment analysis may involve, by way of example, identifying keywords, capitalization of letters, and/or punctuation in one or more messages received from the user and using such criteria to evaluate an emotional state of the user. By studying such conversation messages to estimate the user's emotion, the user assistance system may provide the agent with responses that may be more likely to appeal to the user.

In some embodiments, the user assistance system may score the context-specific action based on agent feedback, such as an input or inputs received by the user assistance system (or, similarly, the absence of such an input or inputs) that indicate a degree of agent approval or disapproval of the context-specific action. To facilitate this, the user assistance system may store or otherwise access and obtain a history of inputs received from agents (e.g., inputs correlated to respective context-specific actions), and may refer to the history of inputs as a basis for scoring the context-specific action.

Further, in some embodiments, the user assistance system may score the context-specific action based on user feedback. To facilitate this, the user assistance system may store or otherwise access and obtain a history of user feedback and may refer to the history of user feedback as a basis for scoring the context-specific action. User feedback may take various forms, such as messages received from users in response to an outcome of a performance of a context-specific action selected by the agent (e.g., "Thank you for sending that knowledge base article! It was very helpful," or "I do not want a new phone in that color."), user-submitted reviews of agent performance, and/or other possibilities.

Based on the scoring of a context-specific action, the user assistance system might or might not select the context-specific action to include in the contextual action bar. The user assistance system may make this selection in various ways. For example, the user assistance system may select a context-specific action if the context-specific action has a score that exceeds a predefined threshold (e.g., a score of 80 or higher, on a scale of 0 to 100). Additionally or alternatively, the user assistance system may select a predefined number of context-specific actions, such as four context-specific actions having the highest scores. Other examples are possible as well.

In any event, upon selection/determination of the context-specific actions to include in the contextual action bar, the user assistance system may provide the contextual action bar for display in the single window of the GUI, such as in the form of GUI elements, as described above. Furthermore, in some embodiments, the user assistance system may be configured to display on the GUI a textual summary of a context-specific action so that the agent can verify what the context-specific action is before deciding to select it. For example, when the agent's mouse cursor hovers over the GUI element for a particular context-specific action for creating a ticket for a new incident, the user assistance system may responsively display "Create New Ticket" above the GUI element. As another example, upon selection of a context-specific action, the user assistance system may display a pop-up window asking the agent to confirm that the agent does in fact want to select the context-specific action. Other examples are possible as well.

Once a given context-specific action is present on the contextual action bar, the agent may provide to the user assistance system, via a client computing device associated with the agent (e.g., agent computing device 602), and input indicative of a selection of the context-specific action. The input may take various forms, such as a mouse click or touch-based selection (via a touchscreen) of the GUI element that corresponds to the context-specific action, for instance. In response to receiving the input, the user assistance system may then perform the selected context-specific action and display on the GUI an outcome of the performance of the selected context-specific action.

In line with the discussion above, many different types of context-specific actions and outcomes are possible. In some embodiments, one such context-specific action may be to provide the user with a status update for the current incident with which the agent is assisting the user. In such embodiments, the status update may take the form of a message that is added to the conversation and sent to the user, and may include information that relates to a given service or services and is displayed in the service region. By way of example, if the user has requested a new laptop computer, the agent may use the interactive workspace in the service region to access a back-end computing system associated with a purchasing department and request the laptop computer. At one or more points during this process, the agent may be presented with the context-specific action to update the user and, when the agent selects this context-specific action, the user may be provided with certain information that is currently (or was previously) displayed in the service region, such as specifications (e.g., color, size, memory) of the laptop computer, a number of laptop computers in stock in inventory, an order confirmation that the laptop has been purchased, and/or tracking information for the order, among other possible information. Other examples are possible as well. In variations of such embodiments, the status update message may include information from other regions or records, such as information from the conversation between the agent and the user and/or information from a previous conversation between the user and a virtual chatbot.

In some embodiments, a context-specific action may be to send the user an email with relevant information. For example, if the agent has used the service region to order a laptop for the user, the agent may be presented with the context-specific action to email the user and, when the agent selects this context-specific action, the user may be sent, to the email address in the user's profile record, an email including an order confirmation for the laptop and various order details. Other examples are possible as well.

In some embodiments, a context-specific action may be to update the incident record based at least in part on content of the conversation and/or information displayed in the service region. For example, if the agent uses the service region to order a laptop computer for the user, selection of this particular context-specific action may cause the user assistance system to update the incident record with information about the laptop computer, the data/time at which the order was placed, and/or other information that is currently (or was previously) displayed in the service region while the agent was ordering the laptop. In a similar example, if the user is specifying, in one or more messages of the conversation, certain desired specifications for the laptop computer, selection of this particular context-specific action may cause the user assistance system to update the incident record with the user's desired specifications. Other examples are possible as well.

In some embodiments, a context-specific action may be to create an incident record—or, phrased another way, to create a ticket for a new incident. In such embodiments, the user assistance system may create the incident record based at least in part on content of the conversation. For example, if the agent and user are conversing about one incident and the user mentions in the conversation a new issue that the user is experiencing, the user assistance system may provide a context-specific action that, when selected, causes the user assistance system to create an incident record for the new issue, and perhaps populate the incident record with relevant information from the conversation and/or other sources. Other examples are possible as well. Further, in such embodiments, upon creation of the incident record, the user assistance system might automatically add to the conversation, in the dialog region, a message indicating that the incident record has been created, and perhaps including a selectable link for viewing the incident record.

In some embodiments, a context-specific action may be to transfer the conversation and/or the incident record from the agent that is currently assisting the user to another agent who is designated as an expert for issues related to the current incident. In such embodiments, the user assistance system may determine based on one or more factors that an expert may be able to provide better assistance to the user regarding the current incident than the agent that is currently assisting the user, and may thus provide a context-specific action for transferring to the expert. The factors upon which the this determination is based may include, but are not limited to, (i) the amount of time that has elapsed since the agent began assisting the user exceeds a predefined threshold (e.g., twenty minutes), (ii) an availability of the expert to provide assistance, and/or (iii) one or more messages in the conversation, such as a message that indicates user dissatisfaction and/or a message where the agent notes that an expert may be able to provide better assistance (e.g., "Let me see if I can find an IT expert to help you out with this issue."). Upon selection of the context-specific action, the user assistance system may assign the incident record to the expert and may provide for display, on a client device relating to the expert, the conversation and/or any other related information. Further, in such embodiments, upon selection of the context-specific action, the user assistance system might automatically add to the conversation, in the dialog region, a message indicating that the user will be transferred or has been transferred to the expert, and perhaps including information related to the expert to which the user will be or has been transferred (e.g., the expert's name, department, and specialties).

In some embodiments, a context-specific action may be to send the user a selectable link referring to a knowledge base article. Such a knowledge base article may relate to the conversation, the user profile record, one or more services, the incident record, and/or information being displayed in the service region. For example, if the user requests assistance with accessing a particular document in a cloud computing environment, the agent may use the service region to access a knowledge base database or other back-end computing system comprising a variety of knowledge base articles, search for an article relating to accessing documents in the cloud, and, once the article is being displayed in the service region, select the context-specific action to send the article to the user. As another example, if the user mentions in one or more messages of the conversation that the user is having trouble using a particular software application, the user assistance system may determine from the message(s) that a particular knowledge base article relating to using the particular software application may be relevant, and may provide the agent with the context-specific action send the knowledge based article to the user. To facilitate this, the user assistance system may be configured to constantly or periodically conduct search queries of the knowledge base based on text included in the dialog region. Other examples are possible as well. In any event, in such embodiments, when the agent selects the context-specific action, the user assistance system might automatically add to the conversation, in the dialog region, the link to the knowledge base article, or might provide the link to the agent as part of a draft message that the agent may choose to edit before sending the message to the user.

In some embodiments, the single window described above may also include an incident queue region. The incident queue region may include an incident queue where various incident records are organized by at least one incident category. When an incident category is selected by the agent, the user assistance system may responsively display in the single window a list of pending incident records (or brief summaries thereof) having the selected incident category. In some examples, an incident category may define, with varying granularity, a type of issue that one or more users have experienced (e.g., "Hardware," "Software," or General Support"). Additionally or alternatively, an incident category might define a group of users and include a list of incidents associated with only the defined group of users. Such a group of users can include a particular department (e.g., "Marketing") or another type of group (e.g., "Administrators," VIPs"). In some examples, certain groups may have priority over others, and thus the user assistance system may assign out pending incidents for higher-priority groups before assigning out pending incidents for lower-priority groups.

In such embodiments, a context-specific action may be to transfer the conversation and/or the incident record from the agent to the list of pending incident records. For example, if the agent can no longer assist the user at the moment, the agent may be provided with the context-specific action to send the current incident record to the incident queue. In addition, the conversation may be saved as part of the incident record or otherwise added to the incident queue as well so that, when the agent or a different agent resumes handling the incident at a later point in time, that agent can view the conversation and possibly glean any helpful information from it. Further, if the current incident record has a particular incident category assigned to it, the user assistance system may sort the current incident record in the incident queue accordingly. Other examples are possible as well. In variations of such embodiments, the actions of transferring to the incident queue and creating a new incident record might be combined into a single context-specific action that, when selected, creates a new incident record and adds the new incident record to the incident queue, also possibly assigning the new incident record a particular incident category.

Furthermore, in some embodiments, additionally or alternatively to having context-specific actions of a contextual action bar, at least a portion of the information provided by the user assistance system in the service region at a given time may be contextual. In such embodiments, the user assistance system might identify contextual terms in the conversation, the service region, or elsewhere, and use such contextual terms as a basis to provide relevant information that might guide the agent to resolve the current incident more efficiently. For example, in a scenario in which the user is requesting a new laptop computer, the user assistance system may provide a link to a page of a purchasing service catalog for laptop computers. Additionally or alternatively, the user assistance system may (i) determine the location of the user based on a user profile record (ii) determine that a previous attempt to find a laptop computer for the user was unsuccessful due to an inventory being low at a location nearest the user, and (iii) determine that the incident has an urgent priority level. Based on at least a portion of this determined information, the user assistance system may provide, in the service region, a purchasing service catalog page that indicates which types of laptop computers are available for purchase within a threshold distance of the user's location, perhaps including laptop computers that fit the user's desired specifications and/or laptop computers that are shipped from other locations near the user.

As another example, in a scenario where the user has an HR issue of a particular topic, the user assistance system may determine the topic and provide, in the service region, an HR service catalog page that includes the contact information for an HR representative associated with the topic. In a variation of this scenario, the user assistance system may determine the user's location and that the user has expressed a desire to see an HR representative in person. In this case, the user assistance system may provide an HR service catalog page that includes the location of an HR representative nearest to the user's location. Other examples are possible as well.

Figure 7A:
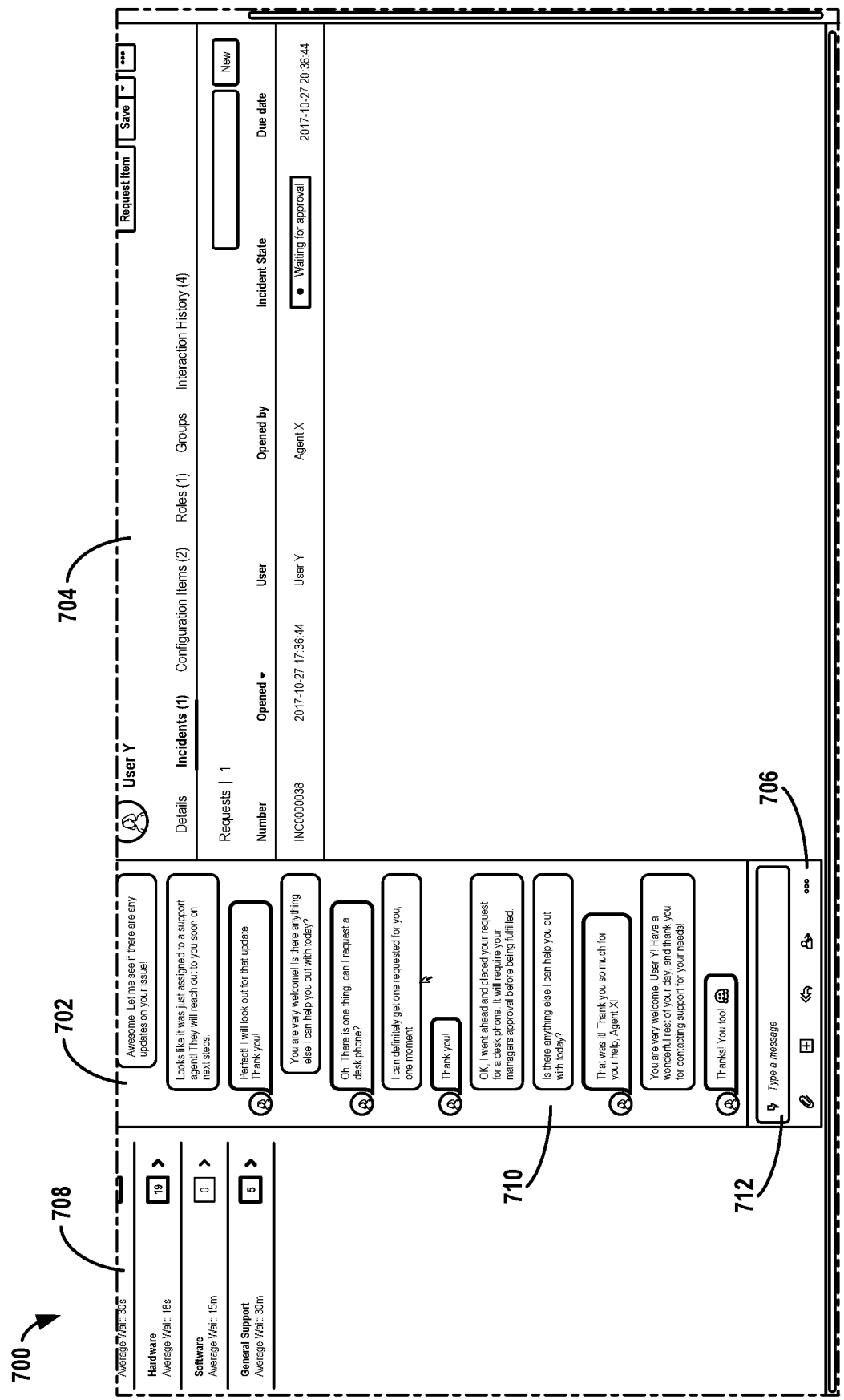
FIG. 7A illustrates a GUI, in accordance with example embodiments.

FIG. 7A illustrates an example window 700 that a computational instance of remote network management platform 320 (e.g., computational instance 322) may provide for display on a GUI. As shown, window 700 includes a dialog region 702, a service region 704 to the right of the dialog region 702, a contextual action bar 706 below the dialog region 702, and an incident queue region 708 to the left of the dialog region 702.

The dialog region 702 includes a first location 710 at which the conversation between the agent (Agent X) and the user (User Y) is displayed. Further, the dialog region includes a second location 712 at which the agent's messages to the user appear before the agent sends them to the user. The contextual action bar 706 is shown below the second location 712 and includes four different context-specific actions. More information regarding particular context-specific actions is provided with regard to FIGS. 7D, 7F, 7G, and 7H.

The incident queue region 708 includes four different incident categories: VIPs, Hardware, Software, and General Support. To the right of each category, the incident queue region 708 displays a current number of pending incidents having that category. Further, to the right of each number, the incident queue region 708 includes an arrow that, when selected, triggers display of a list of pending incidents having that category.

In FIG. 7A, the service region 704 enables the agent to view various information associated with User Y, and includes multiple selectable GUI elements corresponding to various headings. As shown, the heading labeled "Incidents" is selected, and the service region 704 is displaying an incident number, a date/time the incident was opened, a name of the requesting user, the agent that opened the incident, a state of the incident, and a date/time by which the incident should be resolved. Also shown are other headings that, if selected by the agent, may cause the user assistance system to display, in the service region 704, information that corresponds to the selected heading. For example, if the agent selects "Details," the user assistance system may display various user profile record information or other recorded information. As another example, if the agent selects "Configuration Items," the user assistance system may display a list of configuration items associated with User Y. As yet another example, if the agent selects "Groups," the user assistance system may display any group to which User Y belongs (e.g., a department). And as yet another example, if the agent selects "Interaction History," the user assistance system may display information related to any past interactions between User Y and one or more agents.

Further, as shown, some headings include numbers related to the heading. For example, the number 2 next to "Configuration Items" indicates that there are two known configuration items associated with User Y. As another example, the number 1 next to "Incidents" indicates that there is one incident associated with User Y—either only one pending incident, or one incident total (closed and pending).

In accordance with the present disclosure, any or all of the information that corresponds with the headings shown in FIG. 7A, and/or any other information described herein that can be displayed in the service region 704, may be analyzed to identify contextual terms and used as a basis for generating context-specific actions. For example, the user assistance system may be configured to constantly or periodically search text, images, videos, etc. displayed in window 700 (e.g., dialog region 702 and service region 704), and perform various techniques such as natural language processing and machine learning to identify contextual terms in such text, images, videos, etc. The user assistance system may then engage in a process to generate and provide for display one or more context-specific actions based on the identified contextual terms, such as by scoring contextual terms based on relevance and determining context-specific actions relating to contextual terms that meet or exceed a certain threshold score, and/or by determining and scoring multiple context-specific actions and selecting context-specific actions that meet or exceed a certain threshold score, among other possibilities.

FIGS. 7B, 7C, 7D, 7E, 7F, 7G, and 7H illustrate the example window 700 in a scenario in which User Y had been conversing with a virtual chatbot regarding an incident where User Y was requesting a new smartphone, and was then transferred to a live human agent, Agent X. As such, the dialog region 702 includes messages exchanged between User Y and the virtual chatbot before Agent X entered the conversation.

Figure 7B:
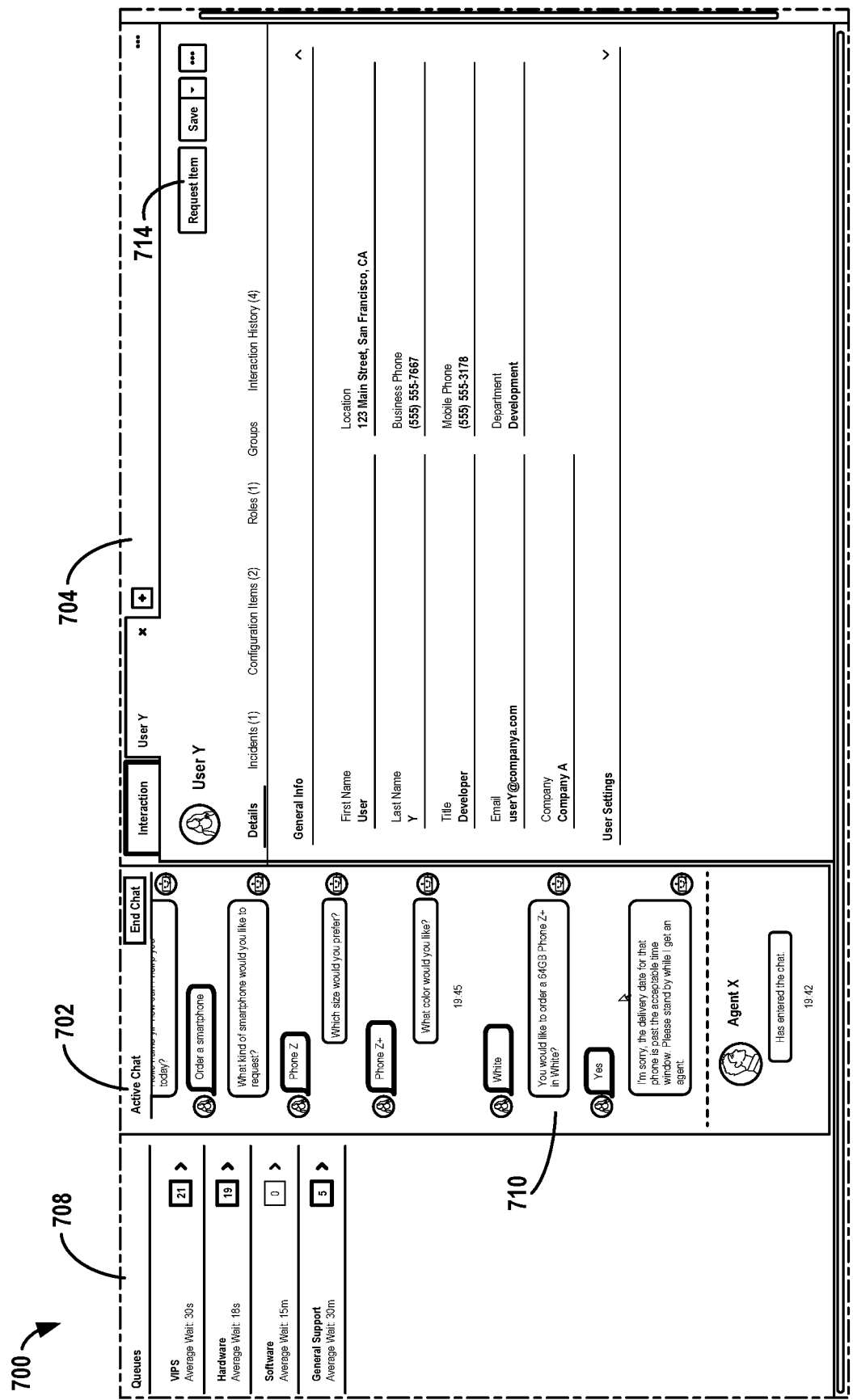
FIG. 7B illustrates a GUI, in accordance with example embodiments.

FIG. 7B, for instance, shows that the "Details" heading for User Y has been selected in the service region 704. Accordingly, the user assistance system has displayed in the service region 704 a variety of user profile information including, amongst other information, the user's name, title, email address, location, and department.

Also shown in FIG. 7B, in a top-left corner of the service region 704 is a GUI element 714 labeled "Request Item." Because User Y is requesting a new smartphone, Agent X may select GUI element 714, which may allow Agent X to access one or more back-end computing systems associated with IT, purchasing, and/or other entities that might facilitate the task of searching for and ordering a new smartphone for User Y, in accordance with User Y's desired specifications (e.g., "White," "64 GB," etc., as shown in the dialog region 702 in the conversation with the virtual chatbot). More generally, however, selection of GUI element 714 might provide, in the service region 704, an interactive workspace (e.g., a service catalog) in which Agent X is presented with the options to request a variety of tangible items (e.g., the new smartphone) or non-tangible items (e.g., a knowledge base article) for User Y.

Figure 7C:
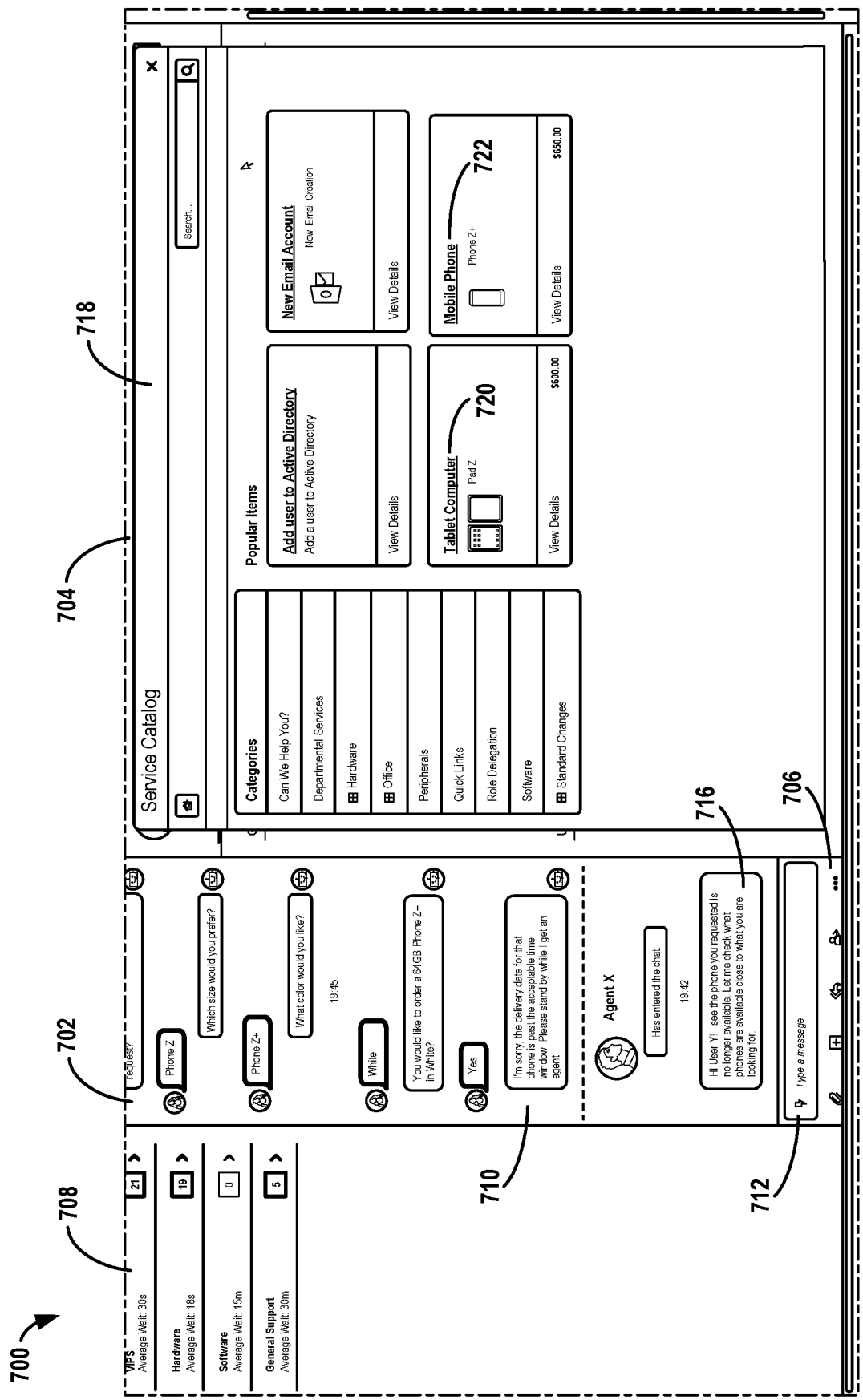
FIG. 7C illustrates a GUI, in accordance with example embodiments.

FIG. 7C shows, in the dialog region 702, that Agent X has sent to User Y a message 716 indicating that the phone that User Y requested is no longer available, but offering to check and see what other smartphones might be available that are similar to what User Y is seeking. In addition, FIG. 7C shows a service catalog window 718 that is contained within the service region 704 and that overlays the user profile information. In some embodiments, however, the service catalog may be provided not as a separate window within the service region 704, but rather as a separate webpage, tab, etc. in the service region 704, that includes a means for navigating between the service catalog and the user profile information shown in FIGS. 7A and 7B.

Using service catalog window 718, Agent X may access purchasing services and search for a smartphone for User Y. Further, in line with the discussion above, the window 700 may enable Agent X to seamlessly switch back to view User Y's profile information at any time. As shown, service catalog window 718 includes, amongst other information, a purchasing catalog including links 720, 722 that, when selected, might navigate Agent X to a page in the catalog where Agent X can purchase certain items.

As discussed above, in addition to using identified contextual terms to generate and provide context-specific actions, the user assistance system may also use identified contextual terms to intelligently provide, in the service region 704, relevant information to help guide the agent to resolving the incident in a more efficient manner. For example, link 722 for "Mobile Phone" may be included on a first page of the purchasing catalog based on the conversation, incident record, or other information indicating that User Y is requesting a new smartphone. In other embodiments, however, at least some information provided in the service region 704 might not be context-based.

Figure 7D:
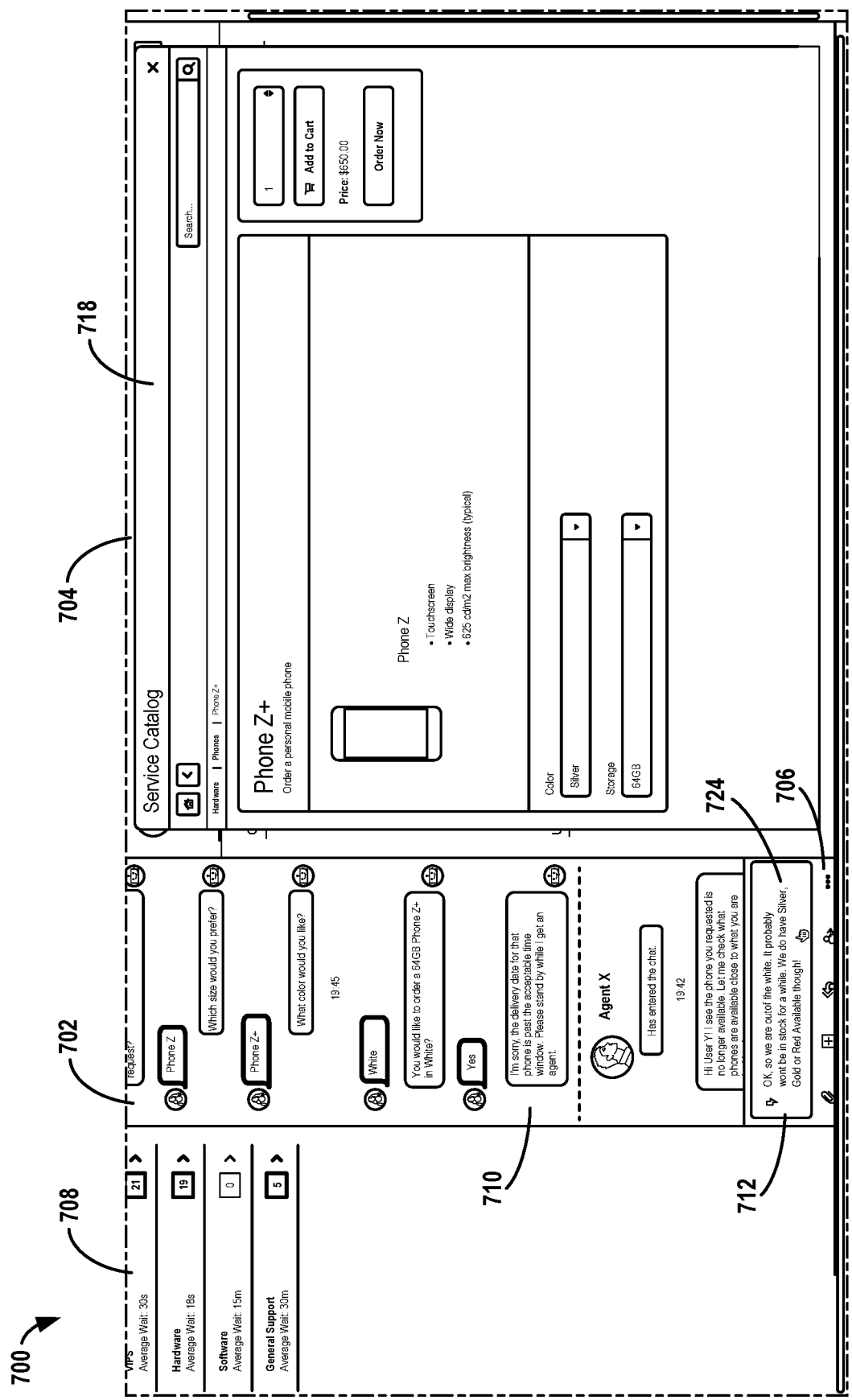
FIG. 7D illustrates a GUI, in accordance with example embodiments.

FIG. 7D shows, in the second location 712 of the dialog region 702, a draft message 724 indicating that the color of phone that User Y requested may not be in stock for awhile, but indicating which colors are available. In addition, FIG. 7D shows, in the service catalog window 718, a page enabling Agent X to select which color User Y's new smartphone should be, as well as how much storage the smartphone should have, and then to place an order for the smartphone. The page may enable Agent X to view phones with the color and storage options available at one or more inventory locations. As such, Agent X is provided with the information necessary to let User Y know, via the draft message 724, what is available. In some embodiments, Agent X may type the draft message 724 themselves. In other embodiments, however, the user assistance system may provide, in the contextual action bar 706, a context-specific action that, when selected, causes the draft message 724 to appear in the second location 712, where the draft message 724 is based on contextual terms in the service region 704 and/or the conversation, such as the available colors left. As an example, context-specific action might be generated for this purpose.

Figure 7E:
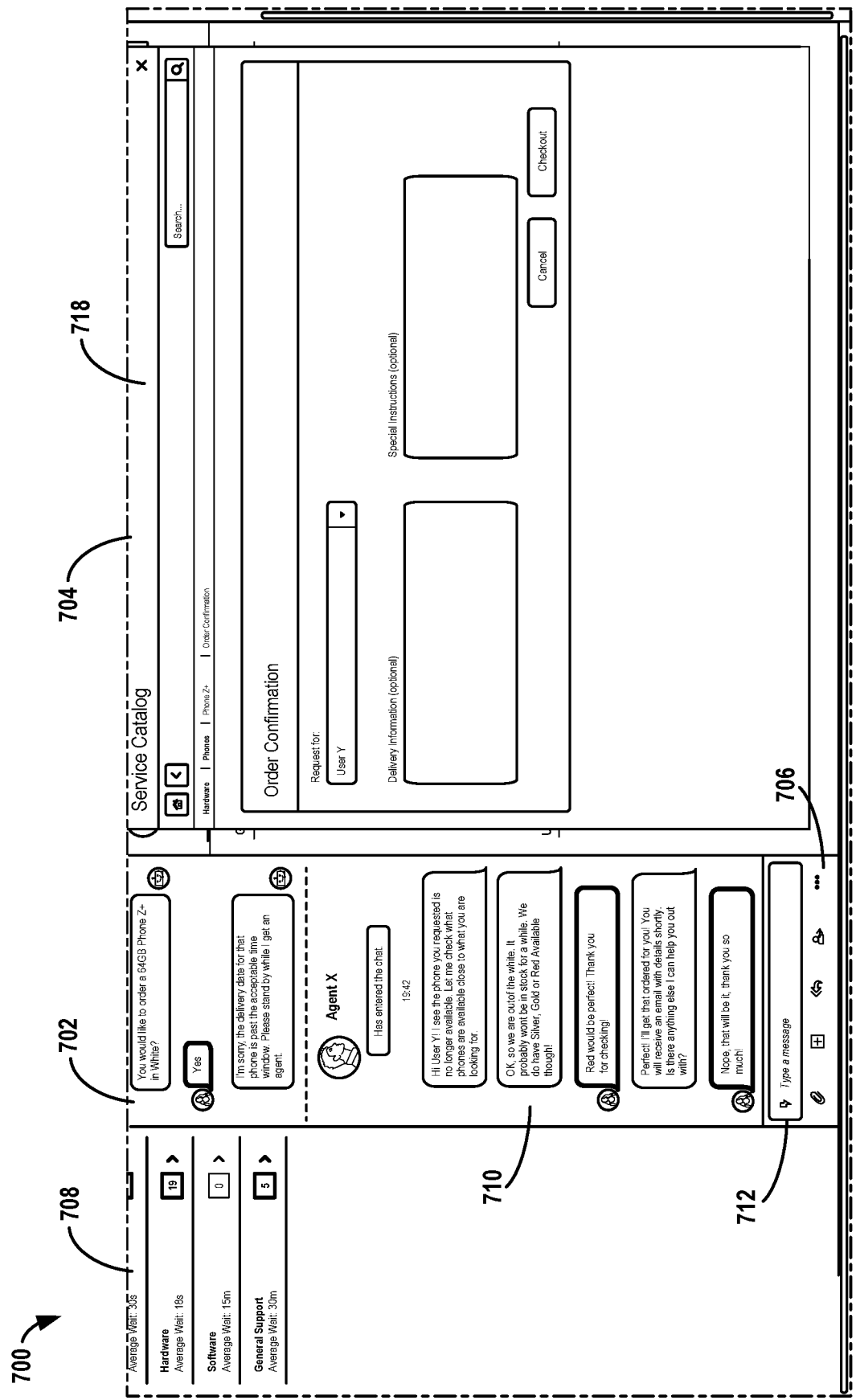
FIG. 7E illustrates a GUI, in accordance with example embodiments.

FIG. 7E shows, in the service catalog window 718, a page that might appear after Agent X selects a command to order a smartphone for User Y. The page includes regions where Agent X can specify, before checking out and completing the order, which user the smartphone is for and any delivery instructions or other instructions.

Figure 7F:
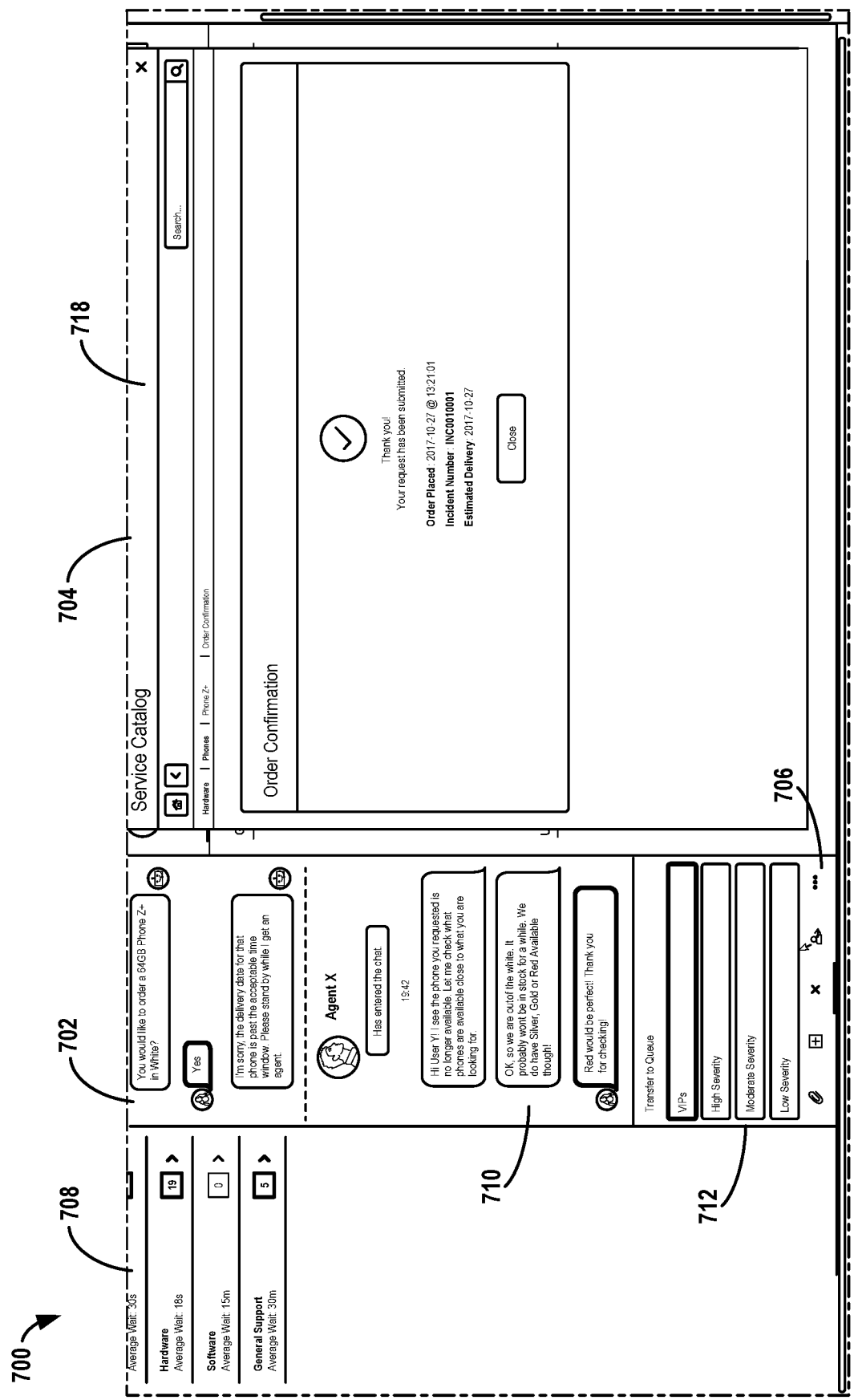
FIG. 7F illustrates a GUI, in accordance with example embodiments.

FIG. 7F shows, in the service catalog window 718, an order confirmation page that might appear after Agent X orders the smartphone for User Y. As shown, the order confirmation page includes a date/time the order was placed, an incident number, and an estimated time for delivery of the smartphone. In some embodiments, including the embodiment illustrated in FIGS. 7F-7H, the user assistance system may be configured to pull certain information from various records and provide such information in the service region 704. As shown, for instance, the user assistance system has pulled the incident number from the incident record so that the agent and/or the user can identify the order by the incident number to which the order corresponds, as opposed to another type of order number. Other examples are possible in which various records, databases, and computing devices may integrate with each other to provide streamlined user assistance.

In addition, FIG. 7F shows that, upon selection of a context-specific action for transferring the incident to the incident queue, Agent X may be presented in the second location 712 of the dialog region 702 with various incident categories (e.g., "High Severity," "Moderate Severity") of the incident queue and may select one of the incident categories to which to add the incident.

Figure 7G:
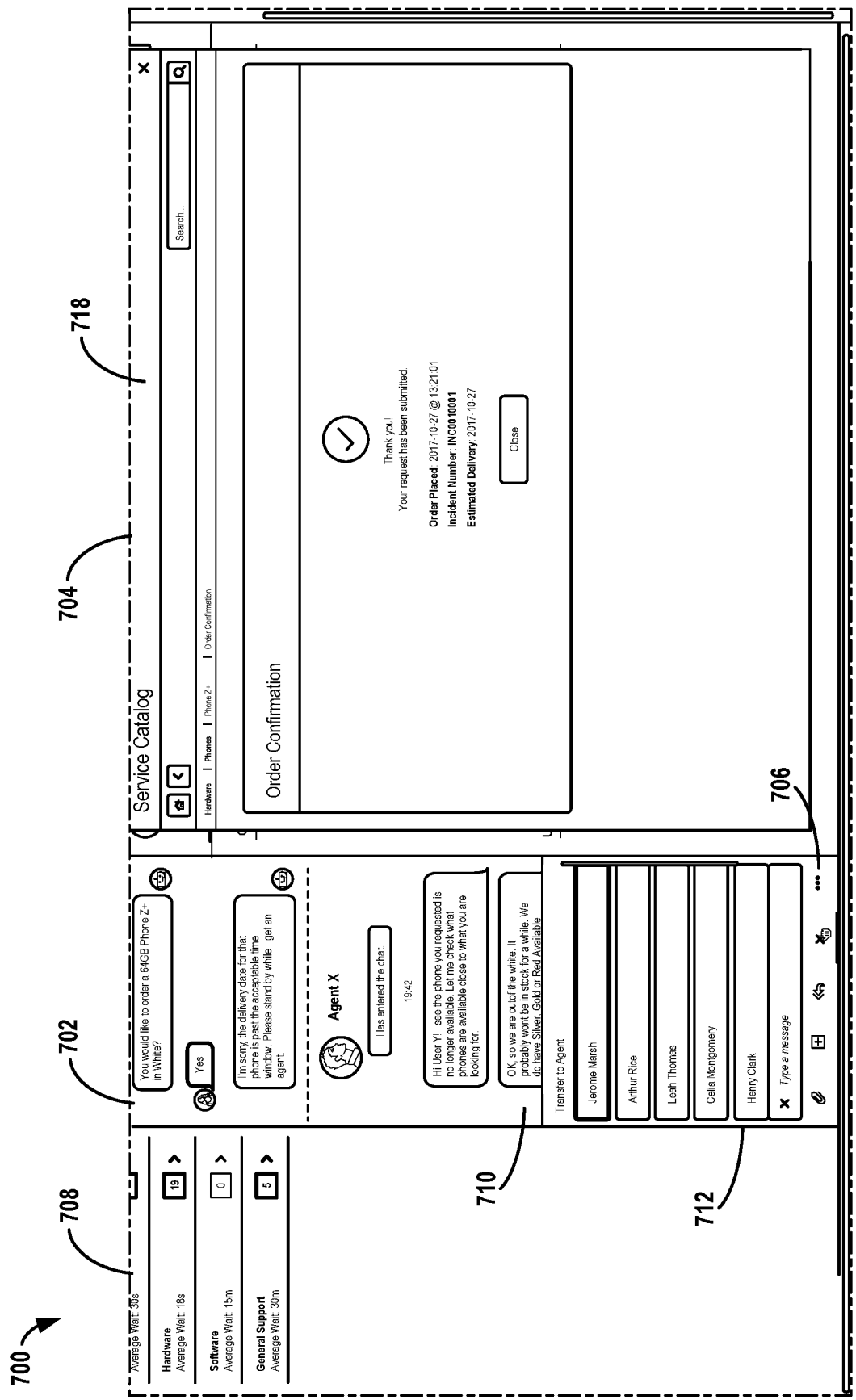
FIG. 7G illustrates a GUI, in accordance with example embodiments.

FIG. 7G shows window 700 in an alternate scenario in which the order confirmation is displayed and the agent has selected a context-specific action for transferring the incident to another agent. In this scenario, upon selection of the context-specific action for transferring the incident to another agent, Agent X may be presented in the second location 712 of the dialog region 702 with various names of agents to whom Agent X could transfer the incident.

Figure 7H:
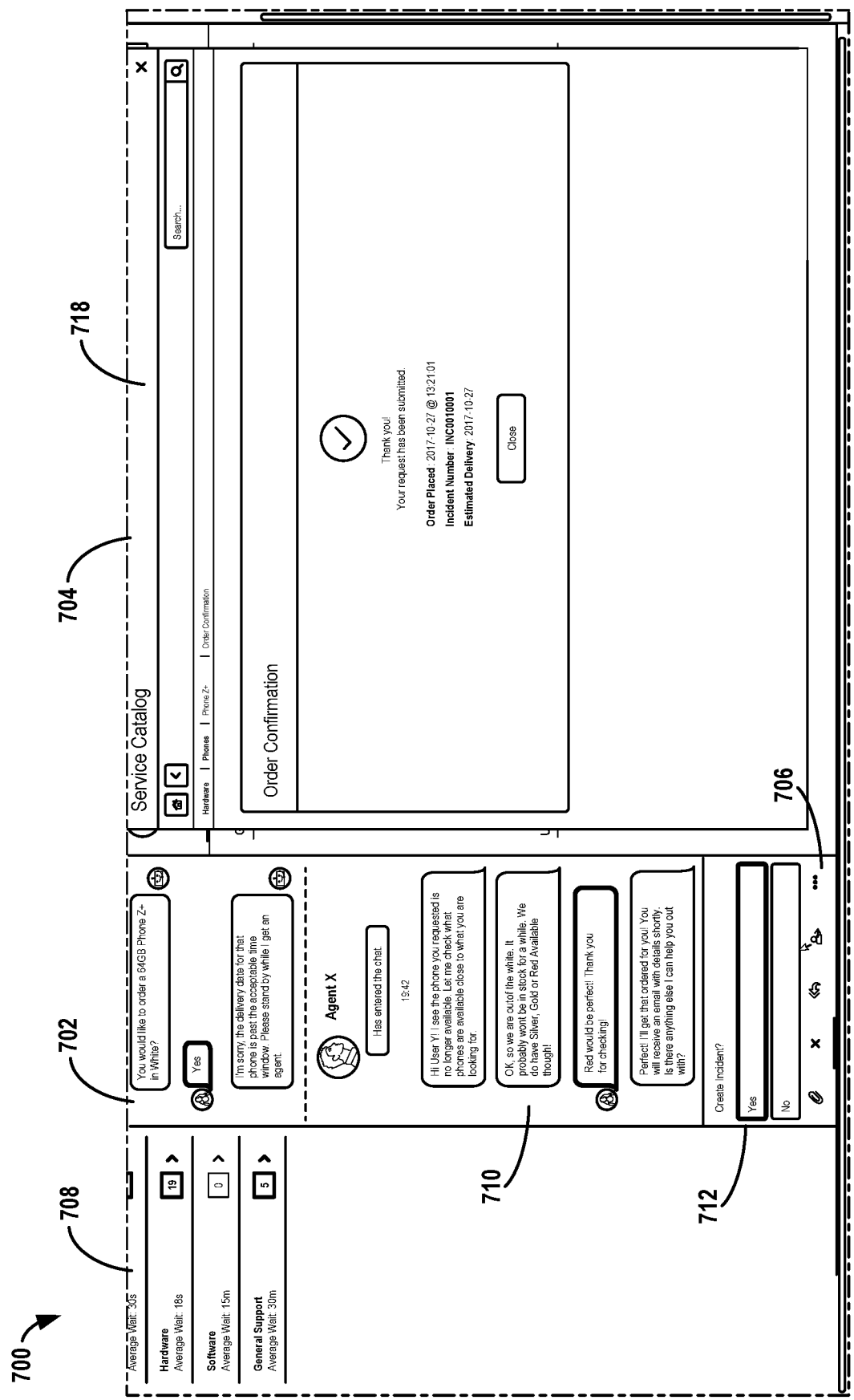
FIG. 7H illustrates a GUI, in accordance with example embodiments.

FIG. 7H shows window 700 in an alternate scenario in which the order confirmation is displayed and the agent has selected a context-specific action for creating a ticket for a new incident. In this scenario, upon selection of the context-specific action for creating a ticket for a new incident, Agent X may be presented in the second location 712 of the dialog region 702 with a prompt to confirm that a new incident is to be created.

In some embodiments, when the order confirmation page is being displayed, the contextual action bar 706 may include a context-specific action that, when selected, causes a draft message to appear in the second location 712 that summarizes the order information for the user and/or includes a link to track the order status, among other possibilities.

Example embodiments and variations of such embodiments have been described above, and it will be understood that other example embodiments and variations thereof are possible as well.

VI. EXAMPLE OPERATIONS

Figure 8:
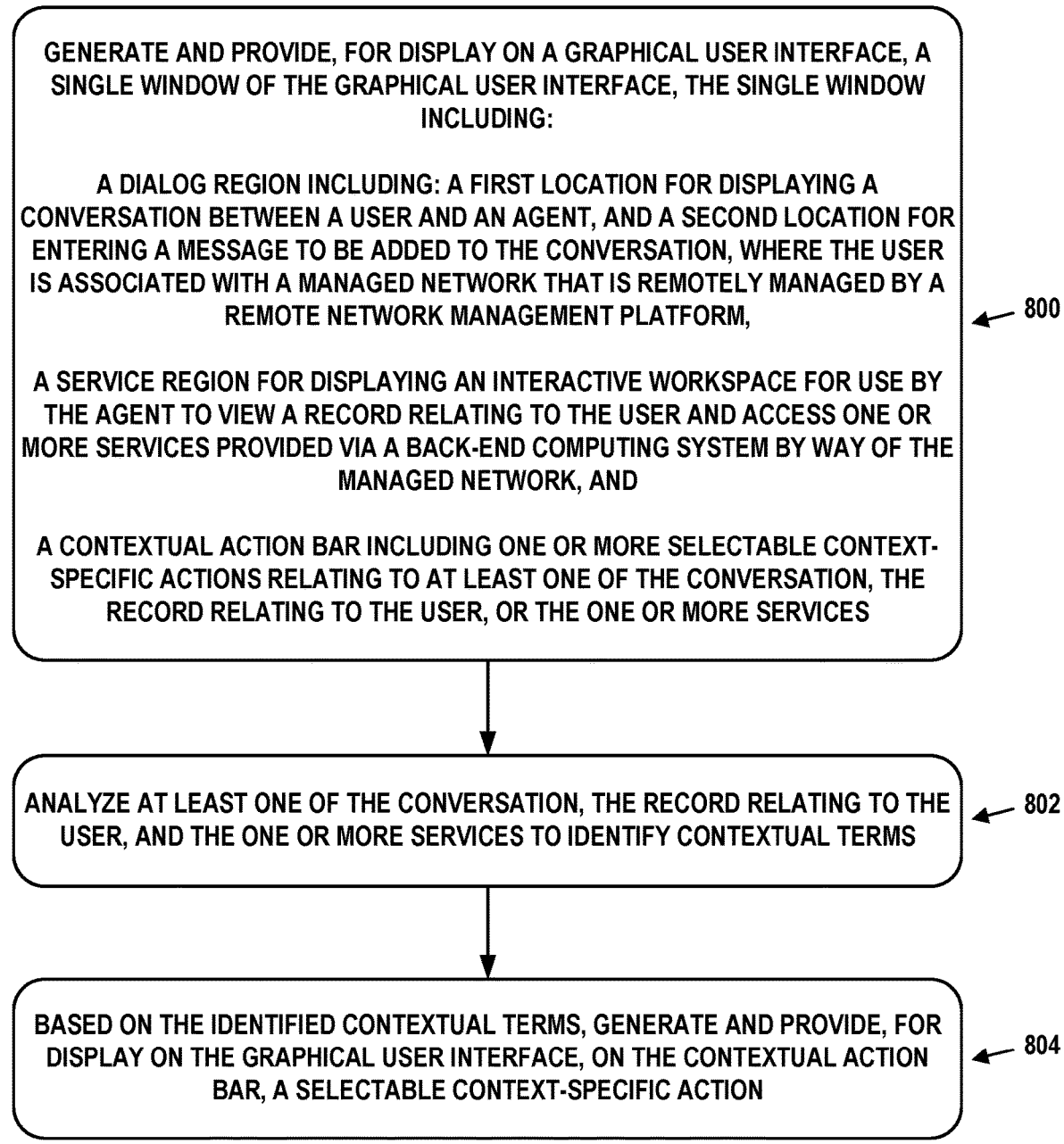
FIG. 8 depicts a flow chart, in accordance with example embodiments.

FIG. 8 depicts a flow chart illustrating an example embodiment. The process illustrated by FIG. 8 may be carried out by a computing device, such as computing device 100, a computational instance, such as computational instance 322, and/or a cluster of computing devices, such as server cluster 200. However, the process can be carried out by other types of devices or device subsystems. For example, the process could be carried out by a portable computer, such as a laptop or a tablet device.

The embodiment of FIG. 8 may be simplified by the removal of any one or more of the features shown therein. Further, this embodiment may be combined with features, aspects, and/or implementations of any of the previous figures or otherwise described herein.

In FIG. 8, block 800 involves generating and providing, for display on a graphical user interface, a single window of the graphical user interface, the single window including: a dialog region including: a first location for displaying a conversation between a user and an agent, and a second location for entering a message to be added to the conversation (the user may be associated with a managed network that is remotely managed by a remote network management platform), a service region for displaying an interactive workspace for use by the agent to view a record relating to the user and access one or more services provided via a back-end computing system by way of the managed network, and a contextual action bar including one or more selectable context-specific actions relating to at least one of the conversation, the record relating to the user, or the one or more services.

Block 802 involves analyzing at least one of the conversation, the record relating to the user, and the one or more services to identify contextual terms.

Block 804 involves based on the identified contextual terms, generating and providing, for display on the graphical user interface, on the contextual action bar, a selectable context-specific action.

In some embodiments, the computing device may receive, by way of the graphical user interface, input from a client device associated with the agent selecting the context-specific action and, in response to receiving the input, perform the selected context-specific action and provide, for display on the graphical user interface, an outcome of the performance of the selected context-specific action.

In such embodiments, the performance of the selected context-specific action may take various forms. In an example, the records may include incident records relating to the users associated with the managed network, the conversation may relate to an incident record for the user, and the performance of the context-specific action may involve generating and providing for display, as part of the conversation, a status update message for the incident record. The status update message may include information that relates to the one or more services and that is being displayed in the service region.

In another example, the records may include incident records relating to the users associated with the managed network, and the performance of the context-specific action may involve creating an incident record based on content of the conversation.

In another example, the records may include incident records relating to the users associated with the managed network, the conversation may relate to an incident record for the user, and the performance of the context-specific action may involve transferring the conversation and the incident record from the agent to another agent who is designated as an expert for issues related to the incident record.

In another example, the records may include incident records relating to the users associated with the managed network, the conversation may relate to an incident record for the user, and the performance of the context-specific action may involve updating the incident record based on at least one of content of the conversation or information displayed in the service region.

In another example, the records may include incident records relating to the users associated with the managed network, the conversation may relate to an incident record for the user, and the performance of the context-specific action may involve providing for display, as part of the conversation, a selectable link referring to a knowledge base article relating to at least one of the conversation, the record relating to the user, the one or more services, the incident record, or information being displayed in the service region.

In another example, the single window may also include an incident queue region including at least one selectable incident category that, when selected, triggers display on the graphical user interface of a list of pending incident records having the incident category. In such an example, the records may include incident records relating to the users associated with the managed network, the conversation may relate to an incident record for the user, and the performance of the context-specific action may involve transferring the conversation and the incident record from the agent to the list of pending incident records.

In some embodiments, the one or more services may include one or more of: human resources services, information technology services, or purchasing services related to the managed network.

In some embodiments, the conversation may include messages exchanged between the user and a virtual chatbot before the agent entered the conversation.

In some embodiments, while the conversation between the agent and the user is ongoing, while the agent is in the process of navigating through the interactive workspace and viewing information using the interactive workspace, and/or while the agent is performing other actions within the single window, the computing device may perform natural language processing on one or more messages from the conversation, information displayed in the service region, and/or other information. Based on the natural language processing and on contextual information derived from the conversation, the service region, etc., the computing device may perform various actions, such as generating and providing one or more selectable context-specific actions on the contextual action bar, generating a message to add to the conversation, and/or other possibilities.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
  a database containing a plurality of records relating to users associated with a managed network; and a computing device associated with a remote network management platform that remotely manages the managed network, the computing device comprising a memory and a processor, wherein the memory comprises instructions executable by the processor, wherein the instructions are configured to cause the processor to:
generate, for display on a graphical user interface, a window of the graphical user interface, the window comprising:
  a dialogue region including: a first location to display a conversation between a user and an agent, and a second location to enter a message to be added to the conversation;
  a service region to display an interactive workspace for use by the agent to view an incident record relating to the user and to access one or more services provided via a back-end computing system by way of the managed network, and wherein the conversation relates to the incident record for the user; and
  a contextual action bar to display one or more context-specific actions relating to the conversation, the incident record relating to the user, and the one or more services;
analyze the conversation, the incident record relating to the user, and the one or more services by applying one or more predetermined classifiers, wherein the one or more predetermined classifiers are indicative of a set of information defining enterprise policies, one or more keywords in the dialogue region, or a location associated with the user, or any combination thereof;
populate the contextual action bar with a context-specific action as a selectable icon, based on the analysis of the conversation, the incident record relating to the user, and the one or more services, and based on a set of rules that define a suitable action via branches of a tree-based structures;
receive, by way of the graphical user interface, an input indicative of selection of the context-specific action; and
in response to receiving the input, perform the selected context-specific action and provide, for display on the graphical user interface, a status message comprising information that relates to the one or more services and the incident record.

2. The system of claim 1, wherein the instructions are configured to cause the processor to
in response to receiving the input, provide, for display on the graphical user interface, an outcome of performing the selected context-specific action.

3. The system of claim 1, wherein the plurality of records include a plurality of incident records, and
wherein performing the context-specific action comprises creating the incident record based on content of the conversation.

4. The system of claim 1, wherein the plurality of records include a plurality of incident records,
wherein the conversation relates to the incident record relating to the user, and
wherein performing the context-specific action comprises transferring the conversation and the incident record from the agent to another agent.

5. The system of claim 1, wherein the plurality of records include a plurality of incident records, and
wherein the conversation relates to the incident record relating to the user, and
wherein performing the context-specific action comprises updating the incident record based on content of the conversation, or information displayed in the service region, or both.

6. The system of claim 1, wherein the plurality of records include a plurality of incident records, and
wherein the conversation relates to the incident record relating to the user, and
wherein performing the context-specific action comprises providing for display, as part of the conversation, a selectable link referring to a knowledge base article relating to the conversation, the incident record relating to the user, the one or more services, or information being displayed in the service region, or any combination thereof.

7. The system of claim 1, wherein the window comprises an incident queue region including a incident category that, when selected, triggers display on the graphical user interface of a list of pending incident records associated with the incident category.

8. The system of claim 7, wherein the plurality of records include a plurality of incident records, and
wherein the conversation relates to the incident record relating to the user, and
wherein performing the context-specific action comprises transferring the conversation and the incident record from the agent to the list of pending incident records.

9. The system of claim 1, wherein the one or more services comprise human resources services related to the managed network, information technology services related to the managed network, or purchasing services related to the managed network, or any combination thereof.

10. The system of claim 1, wherein the conversation includes messages exchanged between the user and a virtual chatbot.

11. The system of claim 1, wherein the one or more predetermined classifiers are indicative of another set of information of a knowledge base article.

12. The system of claim 1, wherein the one or more services comprise a knowledge base service, an information technology service, a human resource service, a purchasing service, a finance service, or any combination thereof.

13. A computer-implemented method comprising:
generating, for display on a graphical user interface, a window of the graphical user interface, the window comprising:
  a dialogue region including: a first location to display a conversation between a user and an agent, and a second location to enter a message to be added to the conversation, wherein the user is associated with a managed network that is remotely managed by a remote network management platform;
  a service region to display an interactive workspace for use by the agent to view an incident record relating to the user and access one or more services provided via a back-end computing system by way of the managed network, and wherein the conversation relates to the incident record for the user; and
  a contextual action bar to display one or more context-specific actions relating to the conversation, the incident record relating to the user, and the one or more services;
analyzing the conversation, the incident record relating to the user, and the one or more services by applying one or more predetermined classifiers, wherein the one or more predetermined classifiers are indicative of a set of information defining enterprise policies, one or more keywords in the dialogue region, or a location associated with the user, or any combination thereof;

populating the contextual action bar with a context-specific action as a selectable icon, based on the analysis of the conversation, the incident record relating to the user, and the one or more services, and based on a set of rules that define a suitable action via branches of a tree-based structures;

receiving, by way of the graphical user interface, an input indicative of selection of the context-specific action; and in response to receiving the input, performing the selected context-specific action and providing, for display on the graphical user interface, a status message comprising information that relates to the one or more services and the incident record.

14. The method of claim 13, comprising:
in response to receiving the input, providing, for display on the graphical user interface, an outcome of performing the selected context-specific action.

15. The method of claim 13, wherein the conversation relates to the incident record relating to the user, and wherein performing the context-specific action comprises generating and providing for display, as part of the conversation, a status update message for the incident record, the status update message including information that relates to the one or more services and that is being displayed in the service region.

16. The method of claim 13, wherein performing the context-specific action comprises creating the incident record based on content of the conversation.

17. The method of claim 13, wherein the conversation relates to the incident record relating to the user, and wherein performing the context-specific action comprises updating the incident record based on content of the conversation, or information displayed in the service region, or both.

18. The method of claim 13, wherein the conversation relates to the incident record relating to the user, and wherein performing the context-specific action comprises providing for display, as part of the conversation, a selectable link referring to a knowledge base article relating to the conversation, the one or more services, the incident record, or information being displayed in the service region, or any combination thereof.

19. An article of manufacture, comprising:
a non-transitory computer-readable medium, having stored thereon program instructions that, upon execution by a computing system associated with a a remote network management platform that remotely manages a managed network, cause the computing system to perform operations comprising:

generating, for display on a graphical user interface, a window of the graphical user interface, the window comprising:
a dialogue region including: a first location to display a conversation between a user and an agent, and a second location to enter a message to be added to the conversation, wherein the user is associated with the managed network;
a service region to display an interactive workspace for use by the agent to view an incident record relating to the user and access one or more services provided via a back-end computing system by way of the managed network, and wherein the conversation relates to the incident record for the user; and
a contextual action bar to display one or more context-specific actions relating to the conversation, the incident record relating to the user, and the one or more services;

analyzing the conversation, the incident record relating to the user, and the one or more services by applying one or more predetermined classifiers, wherein the one or more predetermined classifiers are indicative of a set of information defining enterprise policies, one or more keywords in the dialogue region, or a location associated with the user, or any combination thereof;

populating the contextual action bar with a context-specific action as a selectable icon, based on the analysis of the conversation, the incident record relating to the user, and the one or more services, and based on a set of rules that define a suitable action via branches of a tree-based structures;

receiving, by way of the graphical user interface, an input indicative of selection of the context-specific action; and in response to receiving the input, performing the selected context-specific action and providing, for display on the graphical user interface, a status message comprising information that relates to the one or more services and the incident record.

* * * * *